(12) United States Patent
Yoshii et al.

(10) Patent No.: US 9,226,301 B2
(45) Date of Patent: Dec. 29, 2015

(54) SYSTEM AND METHOD TO SHORTEN THE TIME TAKEN TO IMPROVE INTER-CELL INTERFERENCE MITIGATION PERFORMANCE USING ADAPTIVE FRACTIONAL FREQUENCY REUSE

(75) Inventors: Isamu Yoshii, Kanagawa (JP); Atsushi Sumasu, Kanagawa (JP); Tomohiro Imai, Kanagawa (JP); Naoya Yosoku, Kanagawa (JP); Hidenori Kayama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 640 days.

(21) Appl. No.: 12/678,099

(22) PCT Filed: Sep. 25, 2008

(86) PCT No.: PCT/JP2008/002656
§ 371 (c)(1),
(2), (4) Date: Mar. 12, 2010

(87) PCT Pub. No.: WO2009/041040
PCT Pub. Date: Apr. 2, 2009

(65) Prior Publication Data
US 2010/0222003 A1      Sep. 2, 2010

(30) Foreign Application Priority Data
Sep. 26, 2007   (JP) ................................ 2007-249896

(51) Int. Cl.
*H04W 72/08*     (2009.01)
*H04W 72/04*     (2009.01)
(Continued)

(52) U.S. Cl.
CPC ........... *H04W 72/082* (2013.01); *H04L 5/0032* (2013.01); *H04W 52/243* (2013.01); *H04W 72/0413* (2013.01)

(58) Field of Classification Search
CPC . H04W 72/082; H04W 72/085; H04W 16/10; H04W 24/10
USPC .................................................. 370/329, 252
See application file for complete search history.

(56) References Cited

U.S. PATENT DOCUMENTS

2007/0274343 A1* 11/2007 Nishio ........................... 370/479
2007/0280170 A1* 12/2007 Kawasaki ...................... 370/331
(Continued)

FOREIGN PATENT DOCUMENTS

| WO | 2006/043588 | 4/2006 |
|----|-------------|--------|
| WO | 2006/087797 | 8/2006 |

(Continued)

OTHER PUBLICATIONS

International Search Report dated Jan. 6, 2009.
(Continued)

*Primary Examiner* — Nalini Mummalaneni
(74) *Attorney, Agent, or Firm* — Dickinson Wright PLLC

(57) ABSTRACT

A wireless base station apparatus includes an interference report receiver configured to receive interference reports transmitted on a shared radio resource from a plurality of wireless terminals that are present in a plurality of adjacent cells that are adjacent to a target cell, the shared radio resource being comprised of a plurality of carriers and being shared between the plurality of adjacent cells, and an adaptive fractional frequency reuse controller configured to control adaptive fractional frequency reuse processing in a downlink of the target cell, based on the received interference reports showing a downlink reception quality, wherein the interference reports are transmitted using selected carriers from the plurality of carriers by the plurality of wireless terminals, based on the downlink reception quality.

5 Claims, 30 Drawing Sheets

(51) Int. Cl.
  *H04W 52/24* (2009.01)
  *H04L 5/00* (2006.01)

(56) References Cited

U.S. PATENT DOCUMENTS

2007/0291702 A1* 12/2007 Nanba et al. .................. 370/336
2008/0039131 A1* 2/2008 Kaminski et al. ............. 455/522
2009/0061778 A1* 3/2009 Vrzic et al. ..................... 455/62

FOREIGN PATENT DOCUMENTS

WO    WO 2007108769 A1 *  9/2007
WO    WO 2007112547 A1 * 10/2007

OTHER PUBLICATIONS

3GPP TSG-RAN WG1#48-BIS, R1-071449, "Further Discussion on Adaptive Fractional Frequency Reuse," Mar. 30, 2007, pp. 1-7, p. 1, line 29.

* cited by examiner

SYSTEM AND METHOD TO SHORTEN THE TIME TAKEN TO IMPROVE INTER-CELL INTERFERENCE MITIGATION PERFORMANCE USING ADAPTIVE FRACTIONAL FREQUENCY REUSE

TECHNICAL FIELD

The present invention relates to a transmission control method, wireless communication system and wireless base station apparatus. In particular, the present invention relates to a transmission control method, wireless communication system and wireless base station apparatus adopting adaptive FFR (Fractional Frequency Reuse).

BACKGROUND ART

As a technique for improving throughput degradation due to inter-cell interference, adaptive FFR is proposed. In the adaptive FFR, a transmission use band is divided into the high power transmission band and the low power transmission band. In the low transmission band, transmission power is variable in a stepwise manner, and the mode to support each stage is provided (see FIG. 1).

In a wireless communication system adopting this adaptive FFR, a base station (NB) selects a mode based on an interference report transmitted from a wireless terminal (UE), sets the transmission power associated with this selected mode and then performs downlink transmission. Afterward, it is reported to an adjacent NB that the mode was changed, and, in response to this, the adjacent NB changes the mode. Here, increasing the mode number is equivalent to lowering a reuse factor.

Thus, it is possible to remove interference between adjacent cells and improve throughput.

Non-Patent Document 1: LTE contribution [3GPP TSG-RAN WG1 R1-071449 (Nortel)]

DISCLOSURE OF INVENTION

Problems to be Solved by the Invention

However, upon changing modes, the mode over adjacent cells is not changed until a mode change report is communicated between base stations, and, consequently, delay may occur until inter-cell interference is improved. Here, there arises a problem that this delay due to communication between base stations degrades the system throughput.

It is therefore an object of the present invention to provide a wireless communication system, wireless base station apparatus and transmission control method for shortening the time it takes to improve inter-cell interference and improving the system throughput.

Means for Solving the Problem

The wireless communication system of the present invention including a plurality of wireless base stations provided in a target cell and a plurality of adjacent cells that are adjacent to the target cell, and a plurality of wireless terminals that are present in the cells, where: the plurality of terminals that are present in the plurality of adjacent cells transmit interference reports using a shared radio resource that is shared between the plurality of adjacent cells; and the wireless base station of the target cell employs a configuration having: an interference report receiving section that receives the interference reports transmitted by the shared radio resource from the plurality of wireless terminals that are present in the plurality of adjacent cells; and an adaptive fractional frequency reuse control section that controls adaptive fractional frequency reuse processing in downlink of the target cell, based on the received interference reports.

The wireless base station apparatus of the present invention employs a configuration having: an interference report receiving section that receives interference reports transmitted by a shared radio resource from a plurality of wireless terminals that are present in a plurality of adjacent cells that are adjacent to a target cell, the shared radio resource being shared between the plurality of adjacent cells; and an adaptive fractional frequency reuse control section that controls adaptive fractional frequency reuse processing in downlink of the target cell, based on the received interference reports.

The transmission control method of the present invention includes: an interference report receiving step of receiving interference reports transmitted by a shared radio resource from wireless terminals that are present in the adjacent cells that are adjacent to a target cell, the shared radio resource being shared between adjacent cells; and a controlling step of controlling adaptive fractional frequency reuse processing in the target cell, based on the interference reports.

Advantageous Effect of the Invention

According to the present invention, it is possible to provide a wireless communication system, wireless base station apparatus and transmission control method for shortening the time it takes to improve inter-cell interference and improving the system throughput.

BEST MODE FOR CARRYING OUT THE INVENTION

Figure 1:
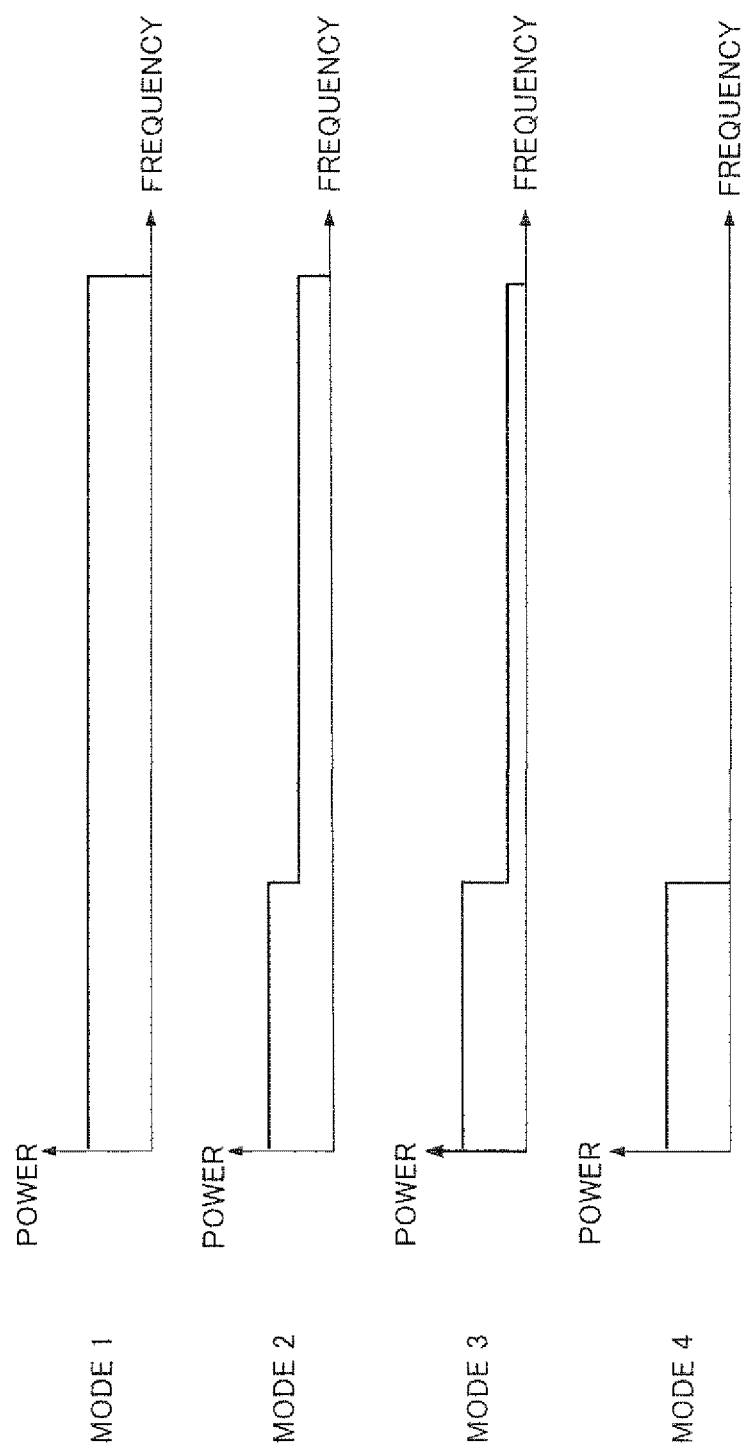
FIG. 1 illustrates adaptive FFR (Fractional Frequency Reuse)

Embodiments of the present invention will be explained below in detail with reference to the accompanying drawings. Also, in the embodiments, the same components will be assigned the same reference numerals and their explanation will be omitted.

Embodiment 1

Figure 2:
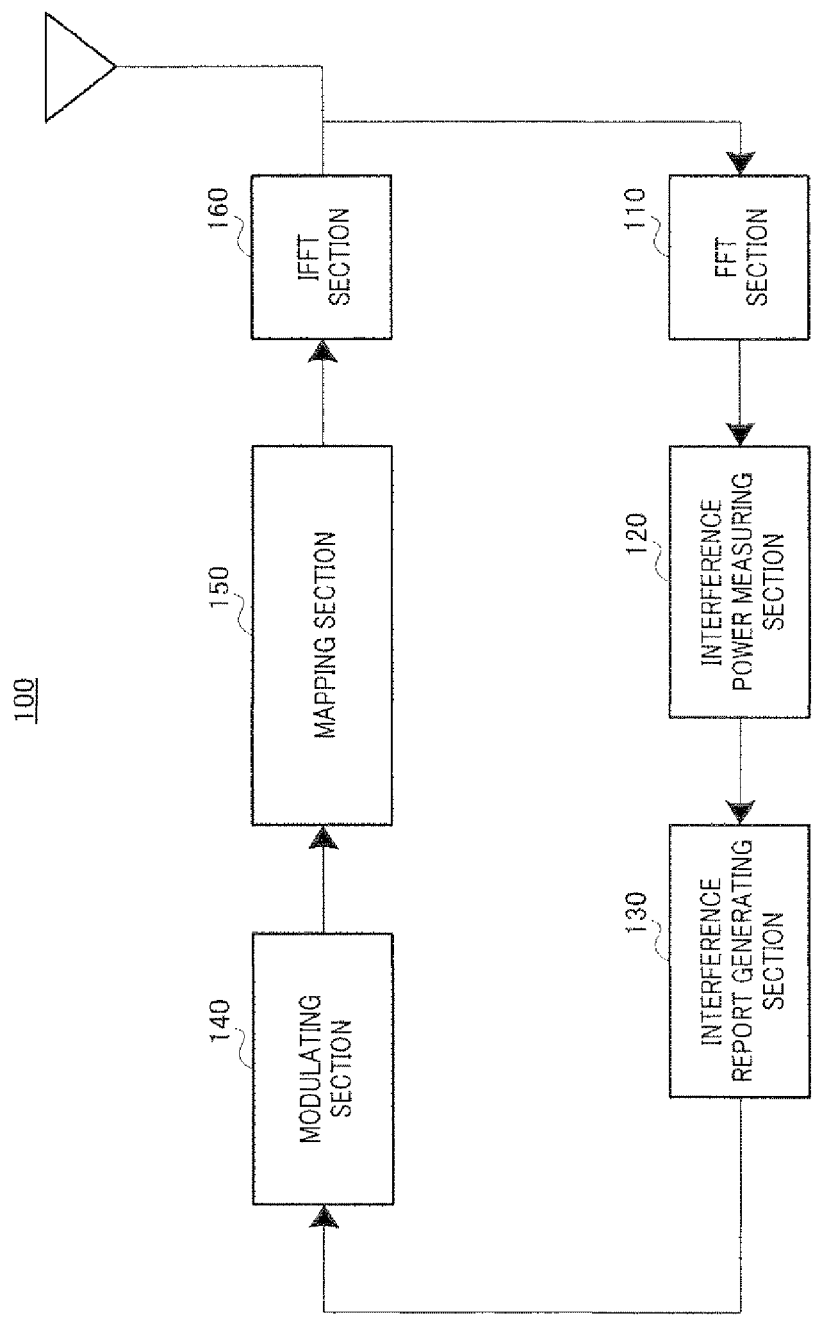
FIG. 2 is a block diagram showing the configuration of a wireless terminal (UE) according to Embodiment 1 of the present invention.

As shown in FIG. 2, wireless terminal (UE) 100 according to the present embodiment is provided with FFT section 110, interference power measuring section 120, interference report generating section 130, modulating section, mapping section 150 and IFFT section 160.

FFT section 110 receives as input an OFDM signal received via an antenna, and performs a Fourier transform of this input signal. The signal subjected to a Fourier transform is outputted to interference power measuring section 120. Here, the input OFDM signal is acquired by performing predetermined radio receiving processing (such as down-conversion and A/D conversion) of a radio reception signal in a radio reception processing section (not shown).

Interference power measuring section 120 measures the power (interference power) of interference signals other than the receiving target signals (i.e. desired signals), using the received signal subjected to a Fourier transform. Further, interference power measuring section 120 outputs the interference power measurement value to interference report generating section 130.

Interference report generating section 130 generates an interference report signal corresponding to the interference power measurement value received from interference power measuring section 120. Further, if the interference power measurement value is greater than a report generation decision threshold, interference report generating section 130 decides that there is interference, and generates an interference report signal. For example, if it is decided that there is interference, a one-bit signal representing bit "1" is generated as an interference report signal. By contrast, if it is decided that there is no interference, a one-bit signal representing bit "0" is generated as an interference report signal.

Modulating section 140 modulates an interference report signal generated in interference report generating section 130, and outputs the modulated interference report signal to mapping section 150.

Mapping section 150 maps the interference report signal received from modulating section 140 on a predetermined "radio resource."

Here, the "radio resource" is defined by a carrier, timing and spreading code.

IFFT section 160 forms an OFDM signal by transforming a signal sequence on which an interference report is mapped, from the frequency domain into the time domain. This OFDM signal is subjected to predetermined radio transmission processing (such as D/A conversion and up-conversion) in a radio transmitting section (not shown) and transmitted via an antenna.

Figure 3:
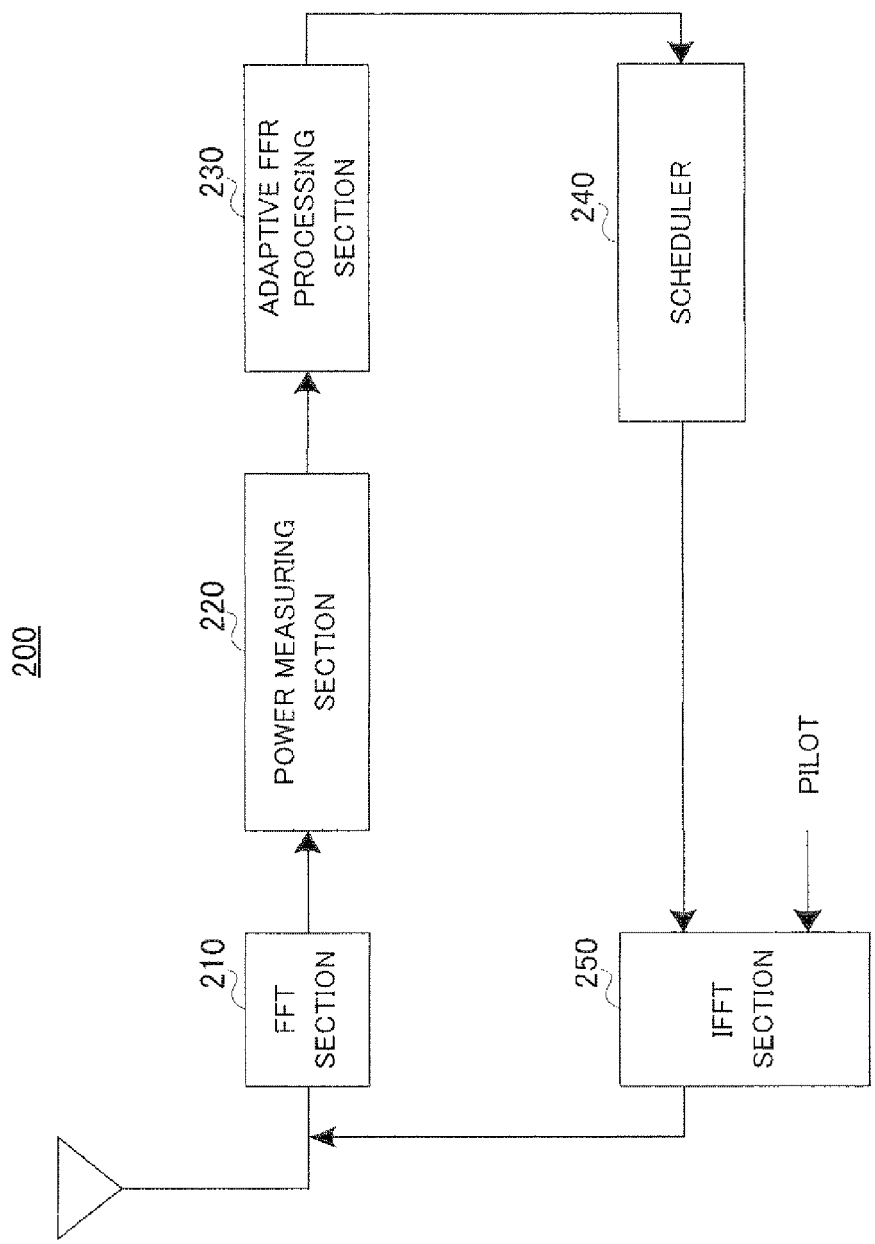
FIG. 3 is a block diagram showing the configuration of a base station (NB) according to Embodiment 1.

As shown in FIG. 3, base station (NB) 200 according to the present embodiment is provided with FFT section 210, power measuring section 220, adaptive FFR (Fractional Frequency Reuse) processing section 230, scheduler 240 and IFFT section 250.

FFT section 210 received as input an OFDM signal received via an antenna, and performs a Fourier transform of the input signal. The received signal subjected to a Fourier transform is outputted to power measuring section 220. Here, the input OFDM signal is acquired by performing predetermined radio receiving processing (such as down-conversion and A/D conversion) of a radio reception signal in a radio reception processing section (not shown).

Power measuring section 220 measures the power in a predetermined radio resource on which the above interference report signal is superimposed. This predetermined radio resource is shared by wireless terminals 100 that exist in cells (adjacent cells) adjacent to the cell of base station 200 (i.e. the subject cell). Therefore, this predetermined radio resource may be referred to as a "shared radio resource."

Also, with the present embodiment, even wireless terminals 100 that exist in the subject cell use this "shared radio resource."

Adaptive FFR processing section 230 controls adaptive FFR processing based on interference reports transmitted from wireless terminals 100.

Adaptive FFR processing section 230 compares the measured power value of the shared radio resource, which was measured in power measuring section 220, and a mode change decision threshold, and changes the transmission mode based on this comparison result. Further, if the measured power value of the shared radio resource is greater than the mode change decision threshold, adaptive FFR processing section 230 decides that interference from other cells to the adjacent cells is large, and changes the transmission mode to reduce the interference given from the subject cell to the adjacent cells.

For example, in the transmission mode explained in the background art, when the mode number increases, the transmission power in the low power transmission band is set lower. That is, when the mode number increases, the reuse factor is set lower. When such a transmission mode is provided in base station 200, adaptive FFR processing section 230 changes the transmission mode to the mode of the next higher number than the currently set mode. That is, adaptive FFR processing section 230 changes the reuse factor to the next lower reuse factor than the currently set reuse factor.

Scheduler 240 changes the allocation of downlink resources to support wireless terminal 100 in the subject cell after the mode is changed. Scheduler 240 forms a downlink transmission signal sequence according to that allocation.

IFFT section 250 receives as input the transmission signal sequence formed in scheduler 240 and a pilot signal, and forms an OFDM signal by performing an inverse Fourier transform of the input signal. This OFDM signal is subjected to predetermined radio transmission processing (such as D/A conversion and up-conversion) in a radio transmitting section (not shown) and transmitted via an antenna.

Next, a wireless communication system formed with wireless terminals 100 and base stations 200 having the above configurations, will be explained.

Figure 4:
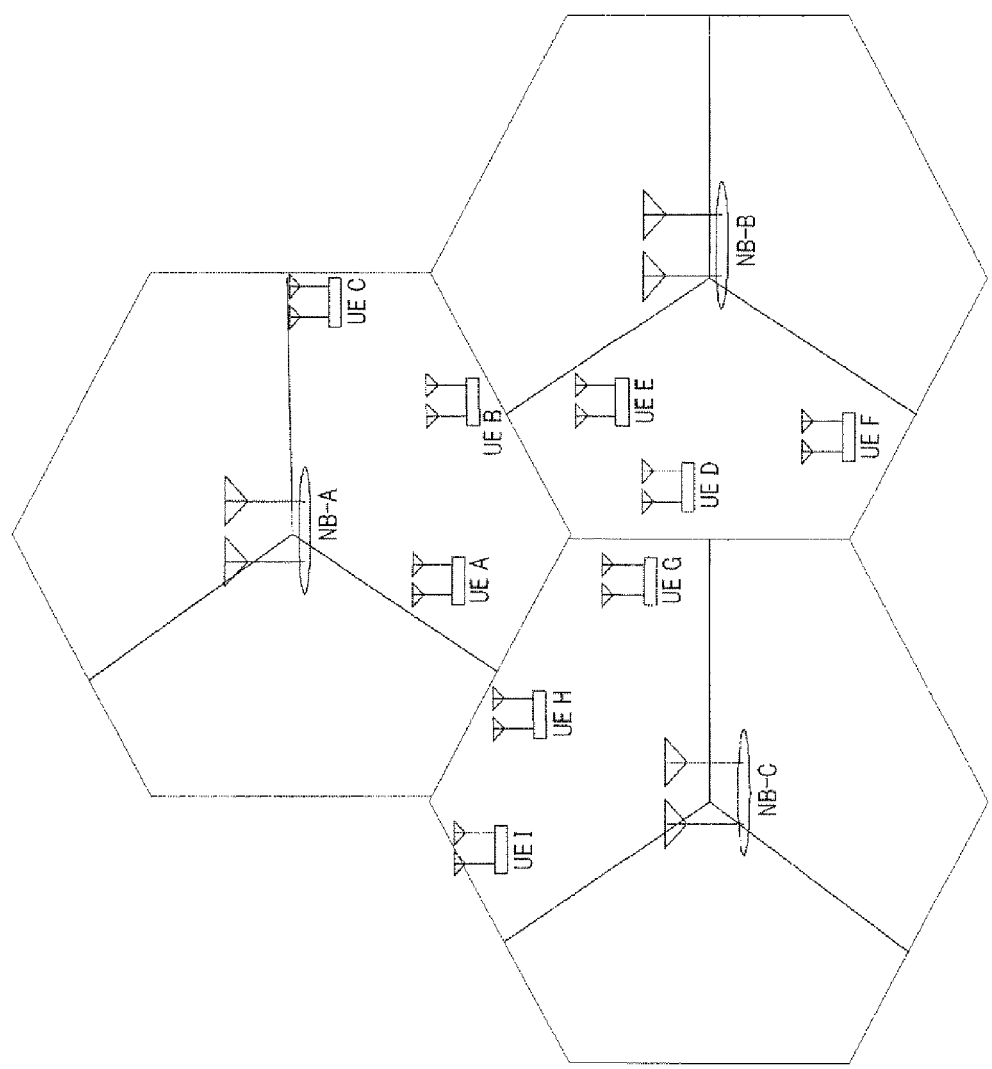
FIG. 4 illustrates a wireless communication system according to Embodiment 1.

As shown in FIG. 4, in a wireless communication system, the cell of one base station 200 is surrounded by adjacent cells, and other base stations 200 are provided in adjacent cell, respectively. In the figure, base station 200 in cell A is represented as NB-A, and, similarly, base station 200 in cell B is represented as NB-B, and base station 200 in cell C is represented as NB-C. In cell A, there are wireless terminals 100 represented as UE-A, UE-B and UE-C. In cell B, there are UE-D, UE-E and UE-F, and, in cell C, there are UE-G, UE-H and UE-I.

Figure 5:
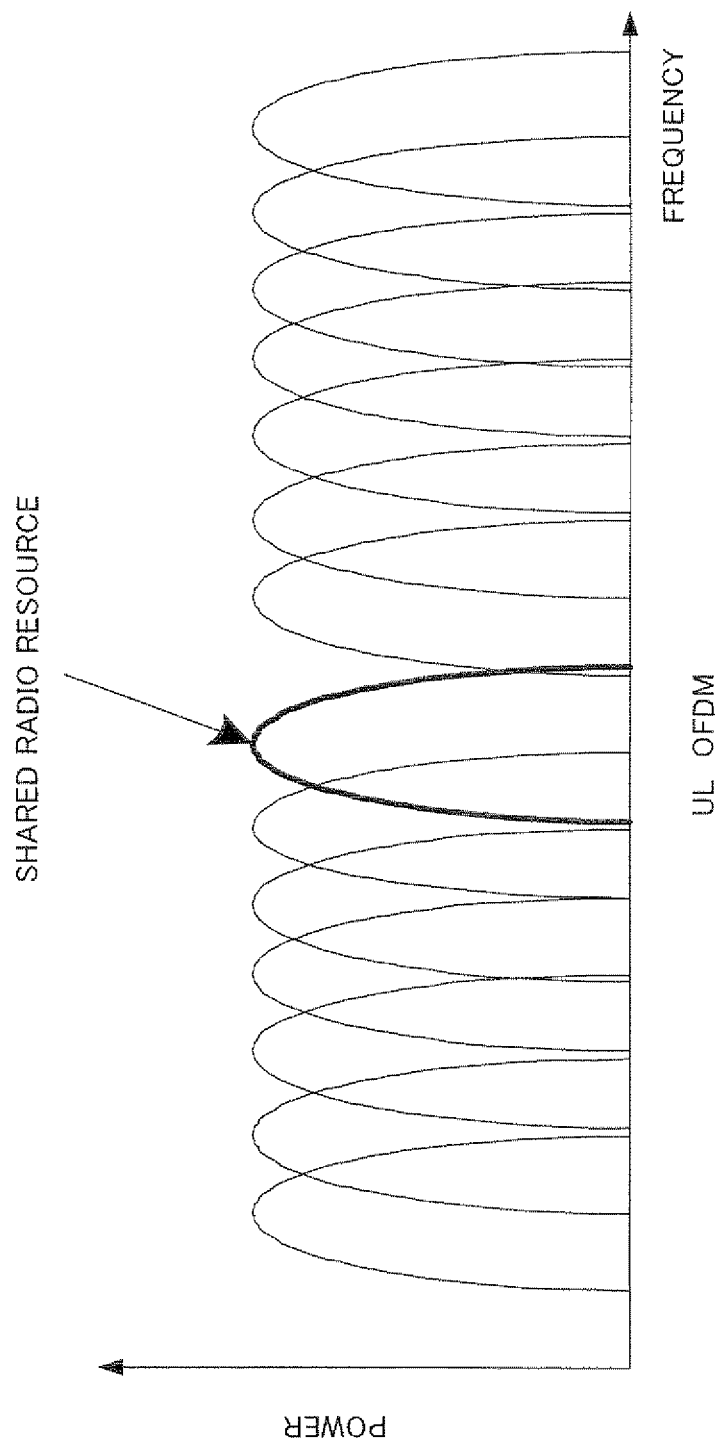
FIG. 5 illustrates a shared radio resource according to Embodiment 1.
Figure 6:
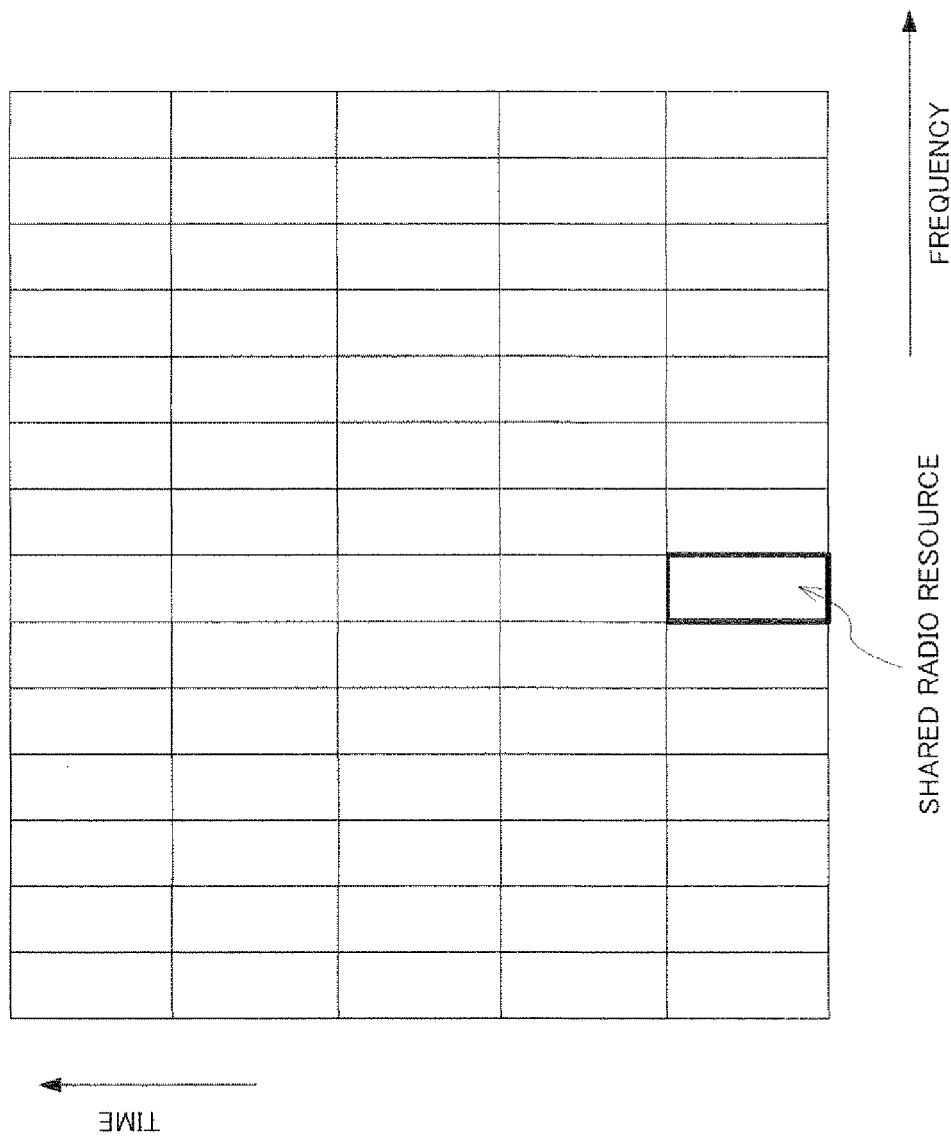
FIG. 6 illustrates a shared radio resource according to Embodiment 1.

NB-A receives interference reports transmitted by a shared radio resource from UE-D, UE-E, UE-F, UE-G, UE-H and UE-I that are present in cells B and C adjacent to cell A. With the present embodiment, one specific subcarrier is used as a shared radio resource (see FIG. 5). Further, interference reports are not always superimposed on that subcarrier. Instead, the interference reports are superimposed only on part of a frame (e.g. one specific symbol in the frame) (see FIG. 6). Also, with the present embodiment, NB-A receives interference reports transmitted by the shared radio resource, from UE-A, UE-B and UE-C that are present in the subject cell.

Figure 7:
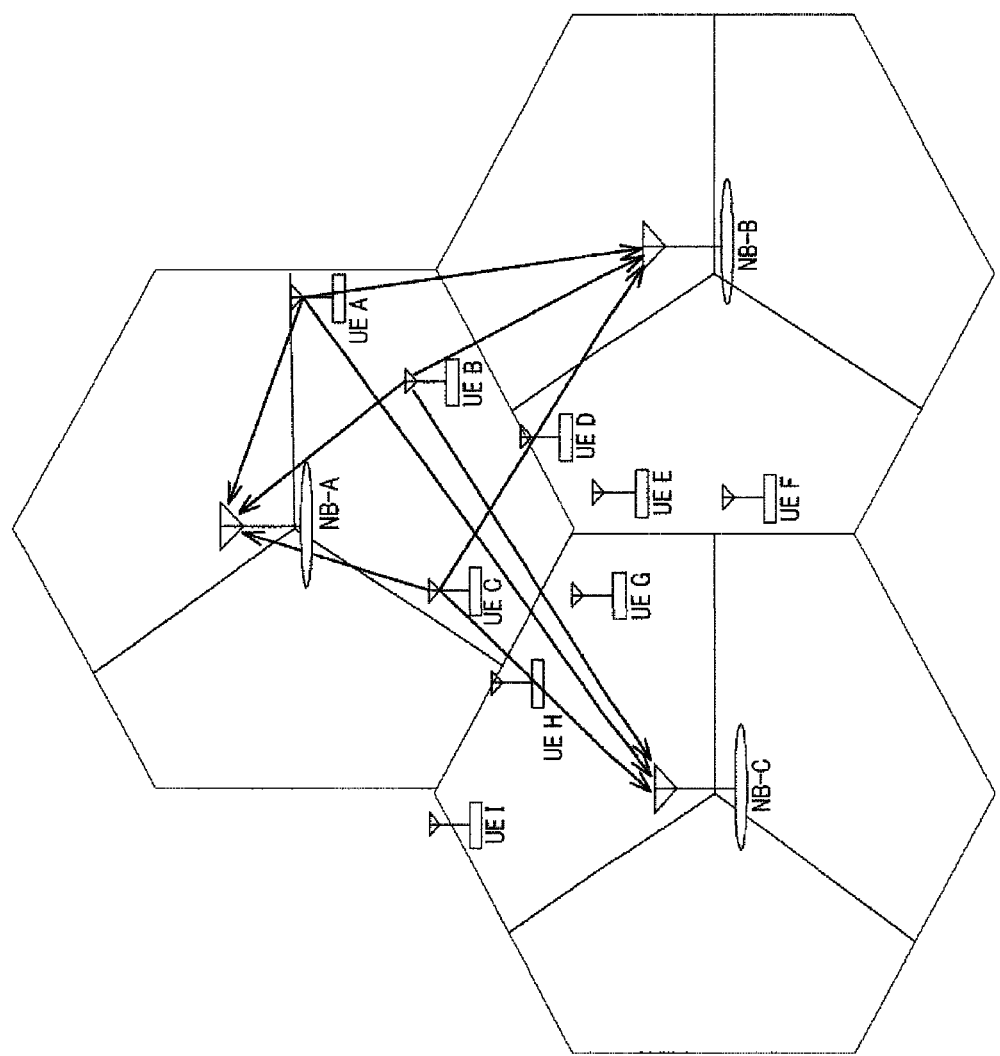
FIG. 7 illustrates interference report transmission from a wireless terminal to a base station according to Embodiment 1.

That is, as shown in FIG. 7, NB-A receives interference reports transmitted by a shared radio resource from the UE's that are present in the subject cell and adjacent cells. Similarly, NB-B and NB-C each receive interference reports transmitted by the shared radio resource from the UE's that are present in the subject cell and adjacent cells.

Figure 8:
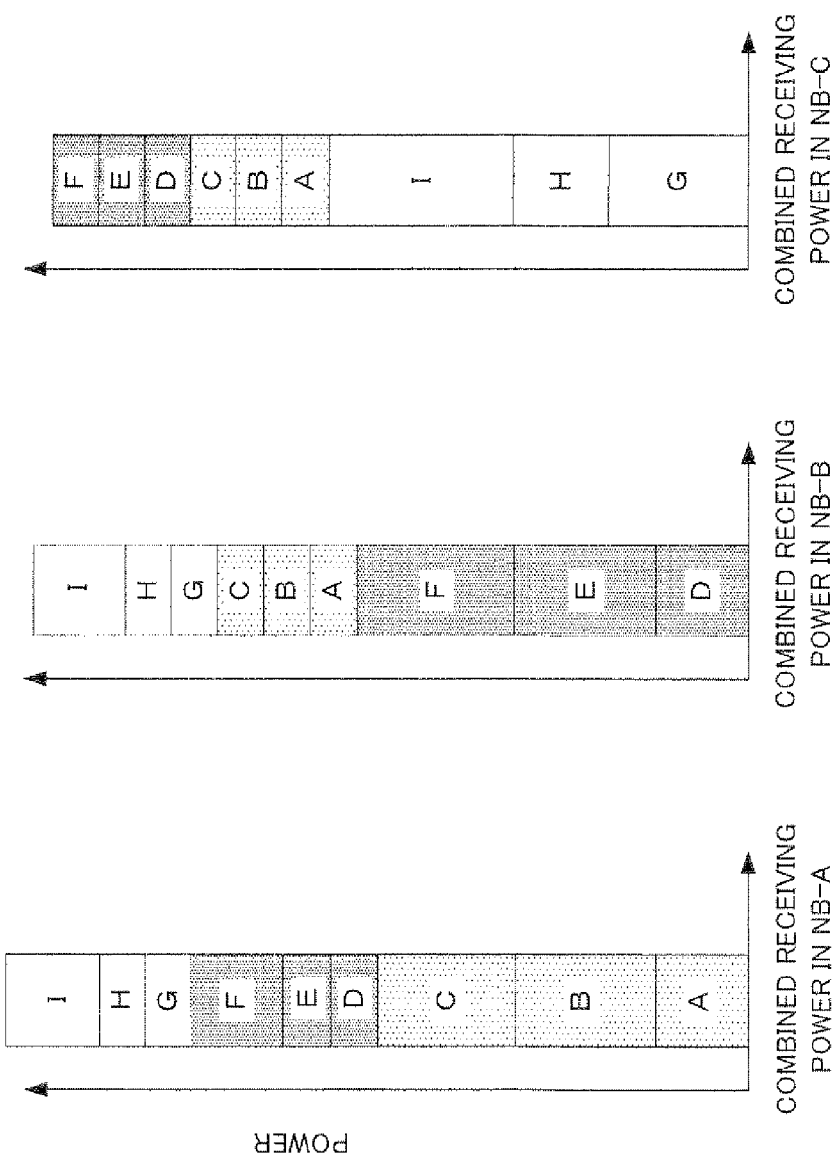
FIG. 8 illustrates the receiving condition of interference reports in base stations according to Embodiment 1.

As shown in FIG. 8, power measuring sections 220 in NB-A, NB-B and NB-C each measure the receiving power of interference reports transmitted by the shared radio resource. That is, the combined receiving power combining the receiving powers of interference reports transmitted by the shared radio resource from the UE's that are present in the subject cell and adjacent cells, is measured.

Figure 9:
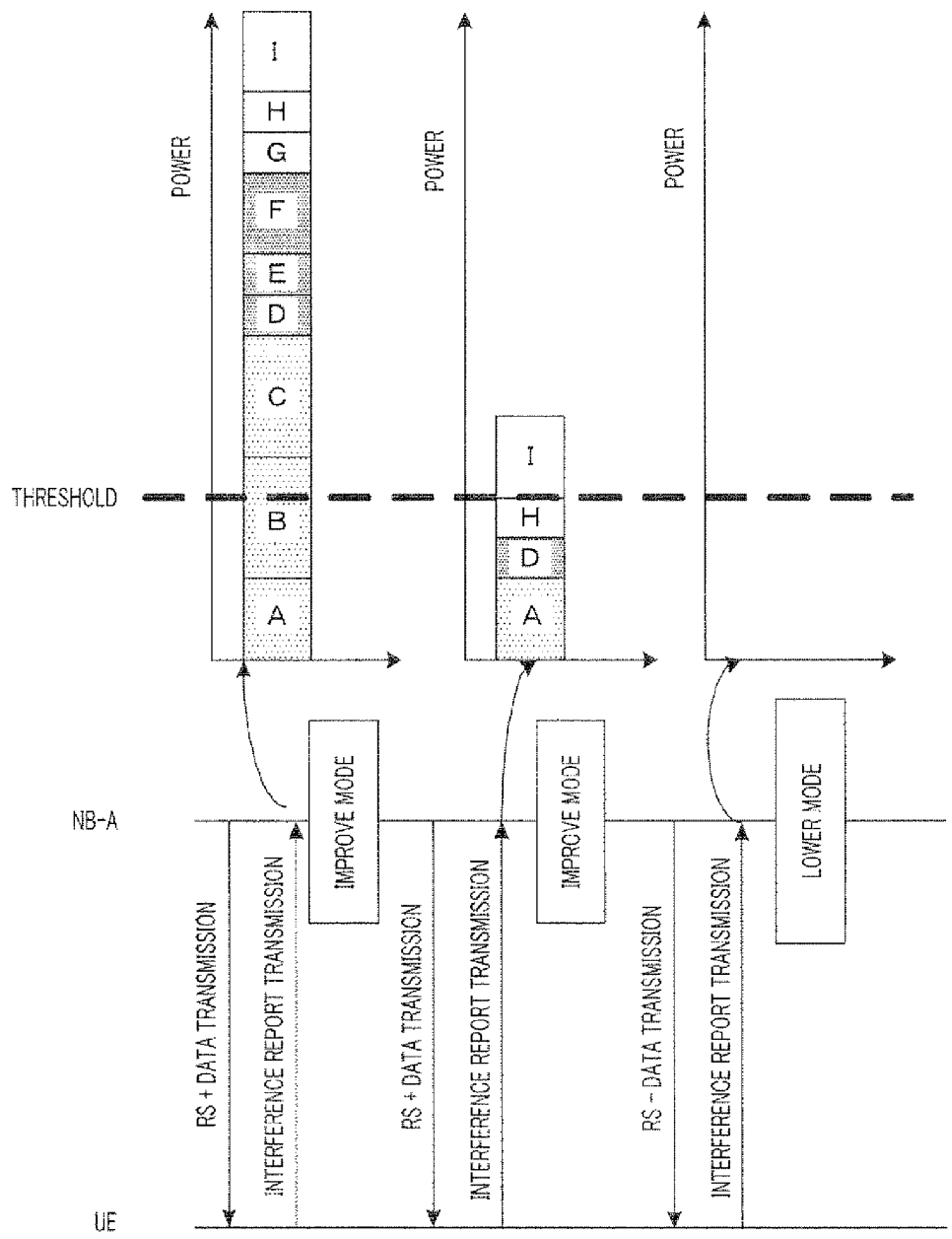
FIG. 9 illustrates adaptive FFR processing in the base station of FIG. 3.

Further, as shown in FIG. 9, adaptive FFR processing sections 230 in NB-A NB-B and NB-C control adaptive FFR processing based on the respective combined receiving powers. Here, this figure shows the case of cell A.

First, NB-A transmits a reference signal ("RS") and data to UE's that are present in cell A. This transmission signal is an interference signal for other UE's. UE's that are present in cell A and adjacent cells transmit interference reports generated in interference report generating sections 130, using a shared radio resource.

In this case, if the combined receiving power of the shared radio resource shown in the left part of FIG. 9 is measured in power measuring section 220 of NB-A, the combined receiving power is beyond the mode change decision threshold. Therefore, adaptive FFR processing section 230 decides that interference given from other cells is large in adjacent cells, and changes the transmission mode to reduce the interference given from the subject cell to the adjacent cells. In this case, the mode number is increased by one stage.

After this transmission mode change, scheduler 240 of NB-A transmits an RS and data after changing the allocation of downlink resources to support wireless terminals 100 in the subject cell. Afterward, the UE's that are present in cell A and adjacent cells transmit interference reports generated in interference report generating sections 130, using the shared radio resource.

If the combined receiving power of the shared radio resource shown in the central part of FIG. 9 is measured in power measuring section 220 of NB-A, the combined receiving power is still beyond the mode change decision threshold. Therefore, the transmission mode number is further increased by one stage.

After this transmission mode change, an RS and data are transmitted again, and, furthermore, interference reports are transmitted.

If the combined receiving power of the shared radio resource shown in the right part of FIG. 9 is measured in power measuring section 220 of NB-A, the combined receiving power is less than the mode change decision threshold. In this case, if there are modes of lower numbers than the number of the current transmission mode, adaptive FFR processing section 230 performs processing for lowering the transmission mode by one stage.

Thus, according to the present embodiment, in base station 200, a radio receiving section (not shown) and FFT section 210, which are interference report receiving sections, receive interference reports transmitted by a shared radio resource that is shared between adjacent cells, from a plurality of wireless terminals 100 that are present in respective adjacent cells, and adaptive FFR processing section 230 controls adaptive FFR processing in downlink in the subject cell based on the received interference reports.

Thus, by receiving interference reports directly from wireless terminals 100 that are present in adjacent cells, it is possible to change the transmission mode taking into account the interference states in adjacent cells. Therefore, a transmission mode change between adjacent base stations 200, which is performed in the prior art, needs not be reported. As a result, the signaling required in the system is reduced, so that it is possible to improve the system throughput.

Further, according to the present embodiment, as a shared radio resource, one symbol (i.e. one specific timing of one specific carrier) is used regardless of the number of wireless terminals 100 that are present in the subject cell and adjacent cells. By this means, it is possible to allocate many radio resources to transmission data other than control signals such as interference reports.

Also, according to the present embodiment, the transmission mode is changed one by one based on the comparison result between the combined receiving power of interference reports and a mode change decision threshold.

By this means, even if interference reports are transmitted by one shared symbol in the subject cell and adjacent cells as above, it is possible to change the transmission mode adequately.

Also, instead of such transmission mode change processing, the following processing may be performed. First, two thresholds of a mode-up change threshold and a mode-down change threshold of a smaller value than the mode-up change threshold, are provided. Further, if the combined receiving power is greater than the mode-up change threshold, the transmission mode is improved by one stage. Also, if the combined receiving power is less than the mode-down change threshold, the transmission mode is lowered by one stage. Also, if the combined receiving power is between the two thresholds, the current transmission mode is maintained.

Embodiment 2

In Embodiment 1, one carrier is used as a shared radio resource. By contrast with this, with the present embodiment, a plurality of carriers are used as a shared radio resource.

Figure 10:
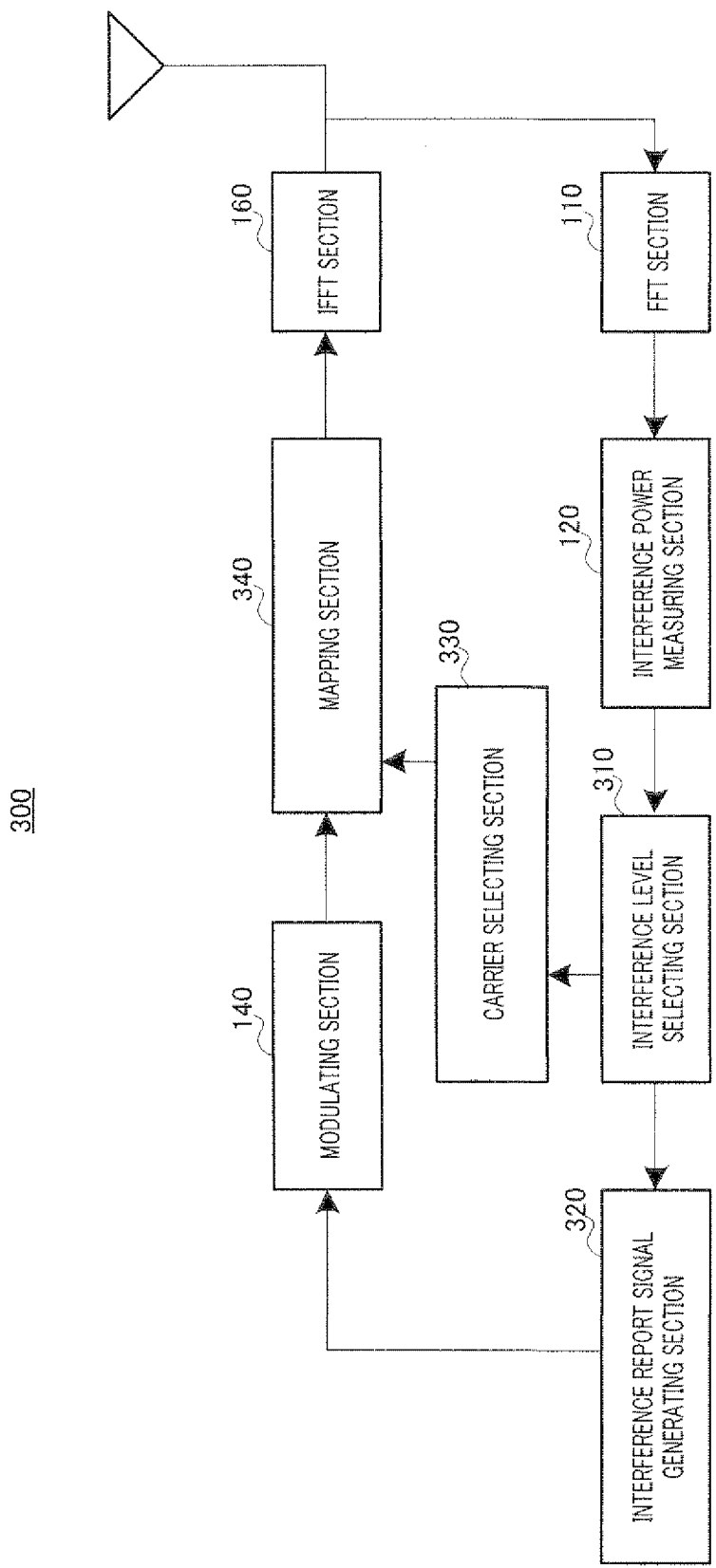
FIG. 10 is a block diagram showing the configuration of a wireless terminal according to Embodiment 2.

As shown in FIG. 10, wireless terminal 300 is provided with interference level selecting section 310, interference report signal generating section 320, carrier selecting section 330 and mapping section 340.

Interference level selecting section 310 stores interference levels based on interference power values. For example, the interference level is 4 in the region where the received SIR is equal to or less than −6 dB, the interference level is 3 in the region where the received SIR is between −6 dB and −3 dB, the interference level is 2 in the region where the received SIR is between −3 dB and 0 dB, and the interference level is 1 in the region where the received SIR is greater than 0 dB.

Interference level selecting section 310 selects the interference level to match an interference power measurement value received from interference power measuring section 120. The selected interference level is outputted to interference report signal generating section 320 and carrier selecting section 330.

Interference report signal generating section 320 generates an interference report signal according to the input interference level received as input from interference level selecting section 310.

Carrier selecting section selects a carrier to match the input interference level from a plurality of carriers forming the shared radio resource.

Mapping section 340 maps an interference report signal acquired via modulating section 140, on the carrier selected in carrier selecting section 330.

Figure 11:
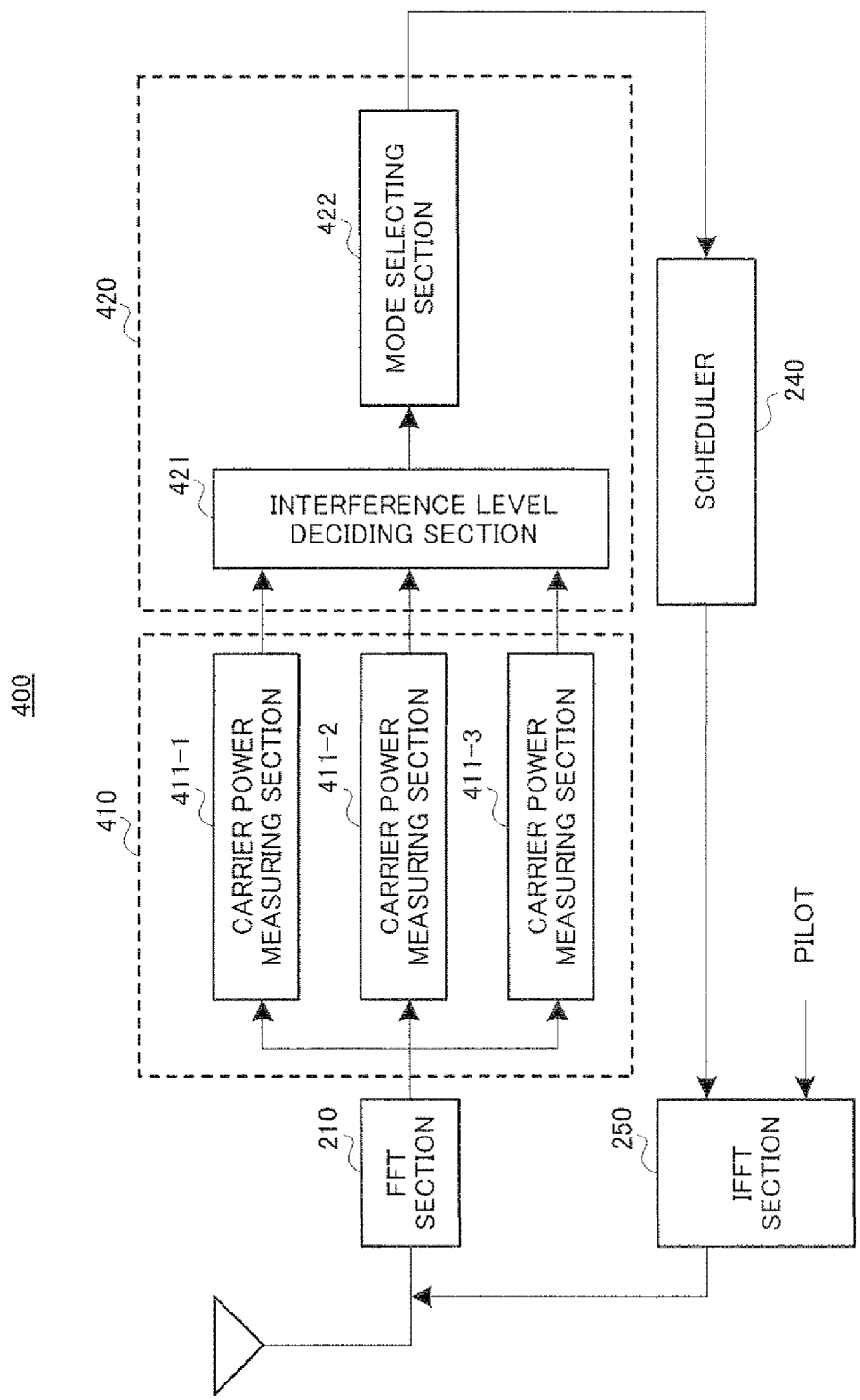
FIG. 11 is a block diagram showing the configuration of a base station according to Embodiment 2.

As shown in FIG. 11, base station 400 has power measuring section 410 and adaptive FFR processing section 420.

Power measuring section 410 measures the power of a predetermined radio resource on which an interference report signal is superimposed. Power measuring section 410 has carrier power measuring sections 411-1 to 411-$n$ respectively associated with n carriers forming the shared radio resource. The figure shows a case where n is 3. Carrier power measuring sections 411 measure the powers of the corresponding carriers and output the measurement results to adaptive FFR processing section 420.

Adaptive FFR processing section 420 has interference level deciding section 421 and mode selecting section 422. Adaptive FFR processing section 420 switches the transmission mode to the transmission mode to match a carrier having the power measurement result received from power measuring section 410 in a predetermined period greater than a predetermined threshold. To be more specific, interference level deciding section 421 compares the power measurement results received from carrier power measuring sections 411 and an interference evaluation decision threshold, and outputs, to mode selecting section 422, carrier identification information indicating the carrier having the power measurement result greater than the interference evaluation decision threshold. Further, mode selecting section 422 selects the transmission mode to match the carrier identification information received from interference level deciding section 421.

Next, a wireless communication system formed with wireless terminals 300 and base station 400 having the above configurations, will be explained. Here, a case will be explained assuming the system is in the condition shown in FIG. 4.

As in Embodiment 1, NB-A receives interference reports transmitted by a shared radio resource from the US's that are present in the subject cell and adjacent cells. However, with Embodiment 2, the shared radio resource includes a plurality of carriers.

A UE selects a carrier to match downlink received quality (e.g. received SIR) from the plurality of carriers, and transmits an interference report using the selected carrier. Also, the present embodiment does not provide a carrier to match the transmission mode selected in the case of the best received quality.

Figure 12:
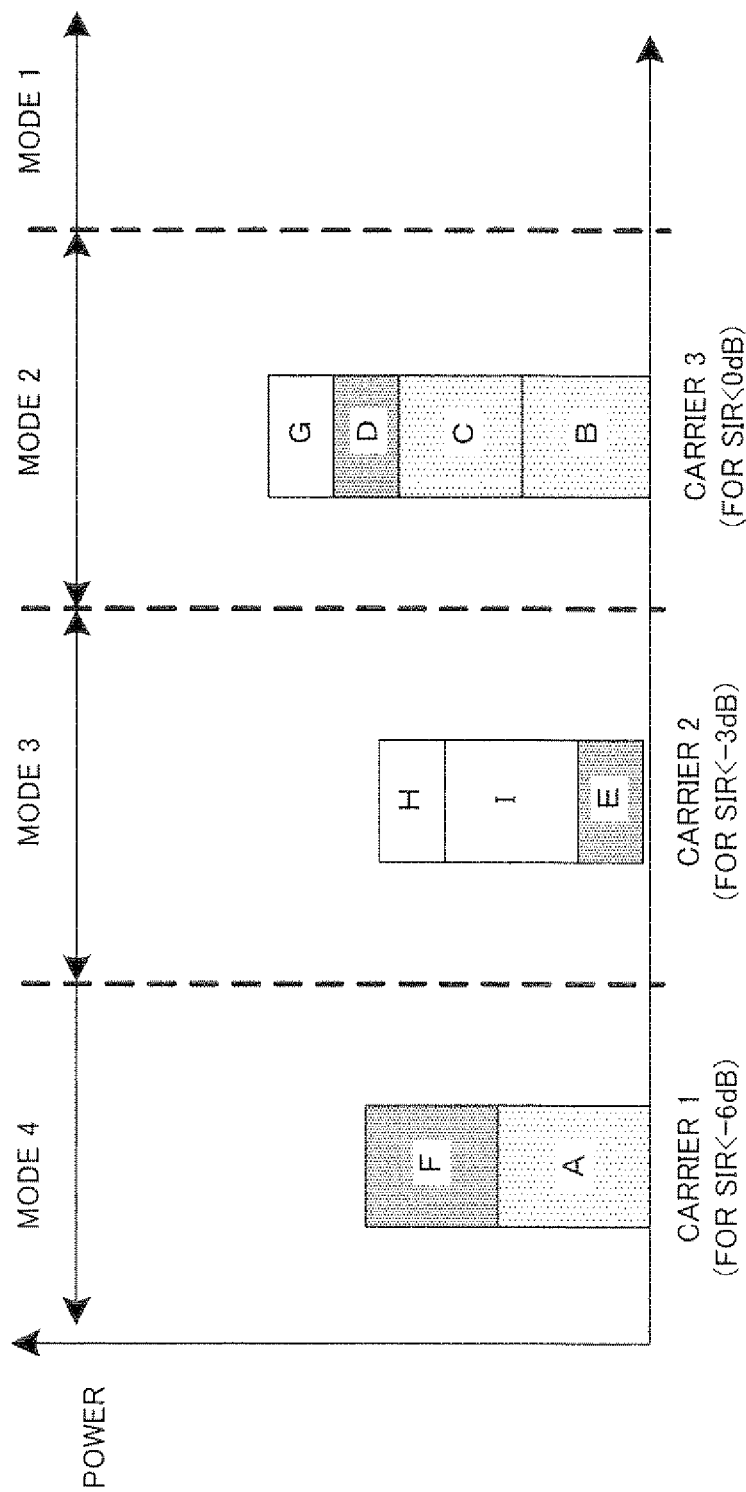
FIG. 12 illustrates the receiving condition of interference reports in base stations according to Embodiment 2.

Thus, interference reports from UE's are received in, for example, NB-A, in the power distributions shown in FIG. 12.

NB-A changes the transmission mode based on a carrier having the power measurement value of the carrier greater than an interference evaluation decision threshold. This transmission mode can be changed by the following methods.

With the first method, the transmission mode is changed to the transmission mode to match the carrier of the lowest downlink received quality among the carriers having the power measurement values greater than an interference evaluation decision threshold. By this means, it is possible to reduce the interference level in all UE's that are present in the subject cell and adjacent cells.

With the second method, the transmission mode is changed to the transmission mode to match the carrier of the highest power measurement value among the carriers having the power measurement values greater than an interference evaluation decision threshold. By this means, it is possible to change the transmission mode to the transmission mode to match the carrier used upon transmitting interference reports by the largest number of UE's.

Also, with either method, the transmission mode selected in the case of the best received quality (e.g. mode 1 in FIG. 12) is selected when the power measurement values of the carriers to match other transmission modes than that transmission mode are all lower than an interference evaluation decision threshold.

Figure 13:
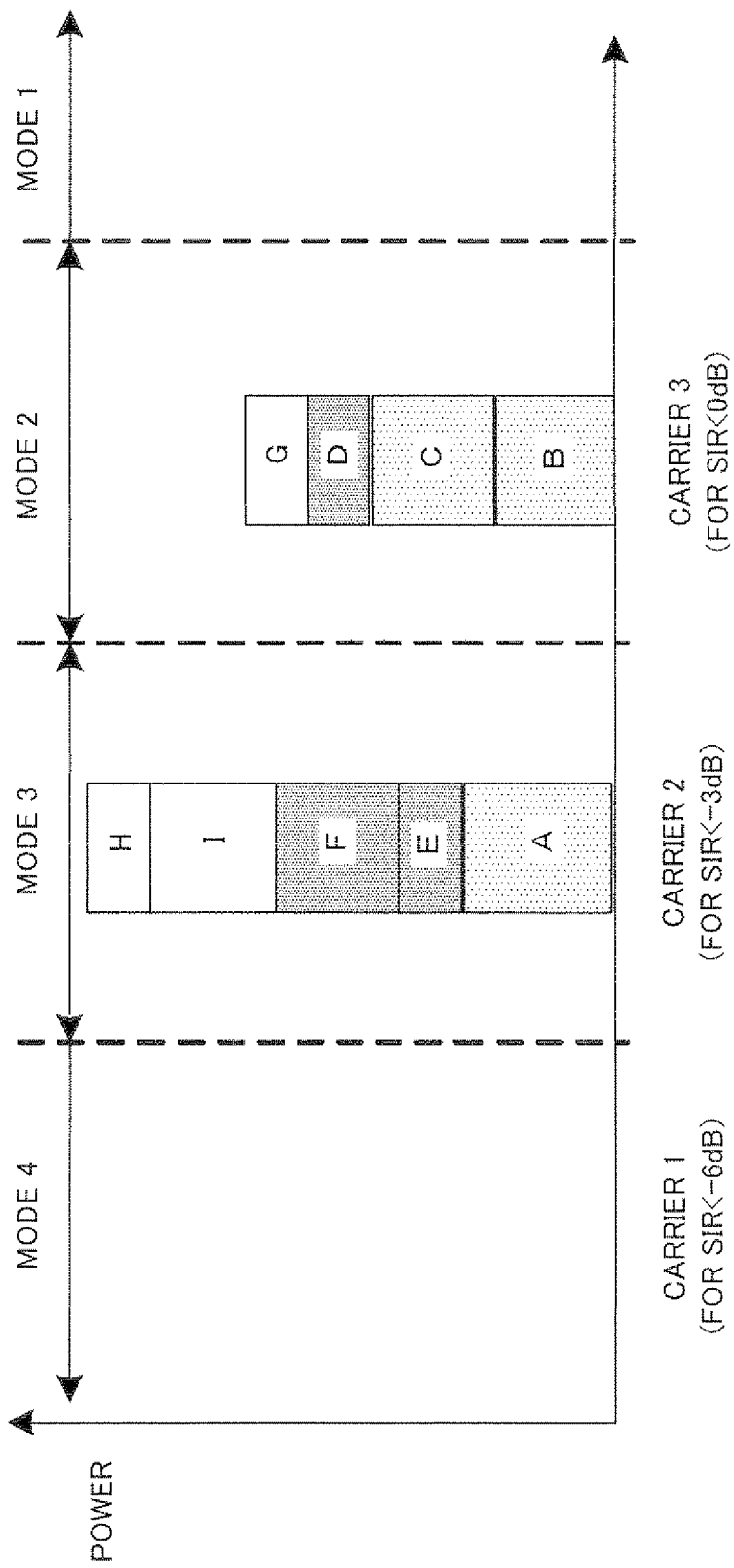
FIG. 13 illustrates the receiving condition of interference reports in base stations according to Embodiment 2.

That is, if the power distributions shown in FIG. 12 are observed in NB-A, mode 4 is selected in the first method and mode 2 is selected in the second method. Also, if the power distributions shown in FIG. 13 are observed in NB-A, mode 3 is selected in both the first method and the second method.

Thus, according to the present embodiment, in wireless terminal 300, carrier selecting section 330 selects a carrier based on a received SIR from a shared radio resource, and mapping section 340 maps an interference report signal on the selected carrier.

By this means, the receiving side of interference report signals specifies the carrier on which interference report signals are superimposed, so that it is possible to understand the interference level in wireless terminals 300 that transmit the interference report signals. Also, a base station, which is the receiving side of interference report signals, receives interference report signals from wireless terminals 300 that are present in the subject cell and adjacent cells, so that it is possible to understand the interference level distributions in the subject cell and adjacent cells.

Also, in base station 400, adaptive FFR processing section 420 switches the transmission mode to the transmission mode to match the carrier used to transmit a plurality of interference reports received in the same period.

By this means, unlike Embodiment 1 that switches the transmission mode in a stepwise manner, the transmission mode is directly changed to the transmission mode to match the carrier on which interference reports are superimposed, so that it is possible to switch the transmission mode to an adequate transmission mode fast.

Embodiment 3

In Embodiment 1, the transmission mode is changed in a stepwise manner based on a comparison result between the measured power value of a shared radio resource and a mode change decision threshold. By contrast with this, the present embodiment associates transmission modes and the power value ranges in advance, and changes the transmission mode directly to the transmission mode associated with a power value range to which a measured power value belongs.

Figure 14:
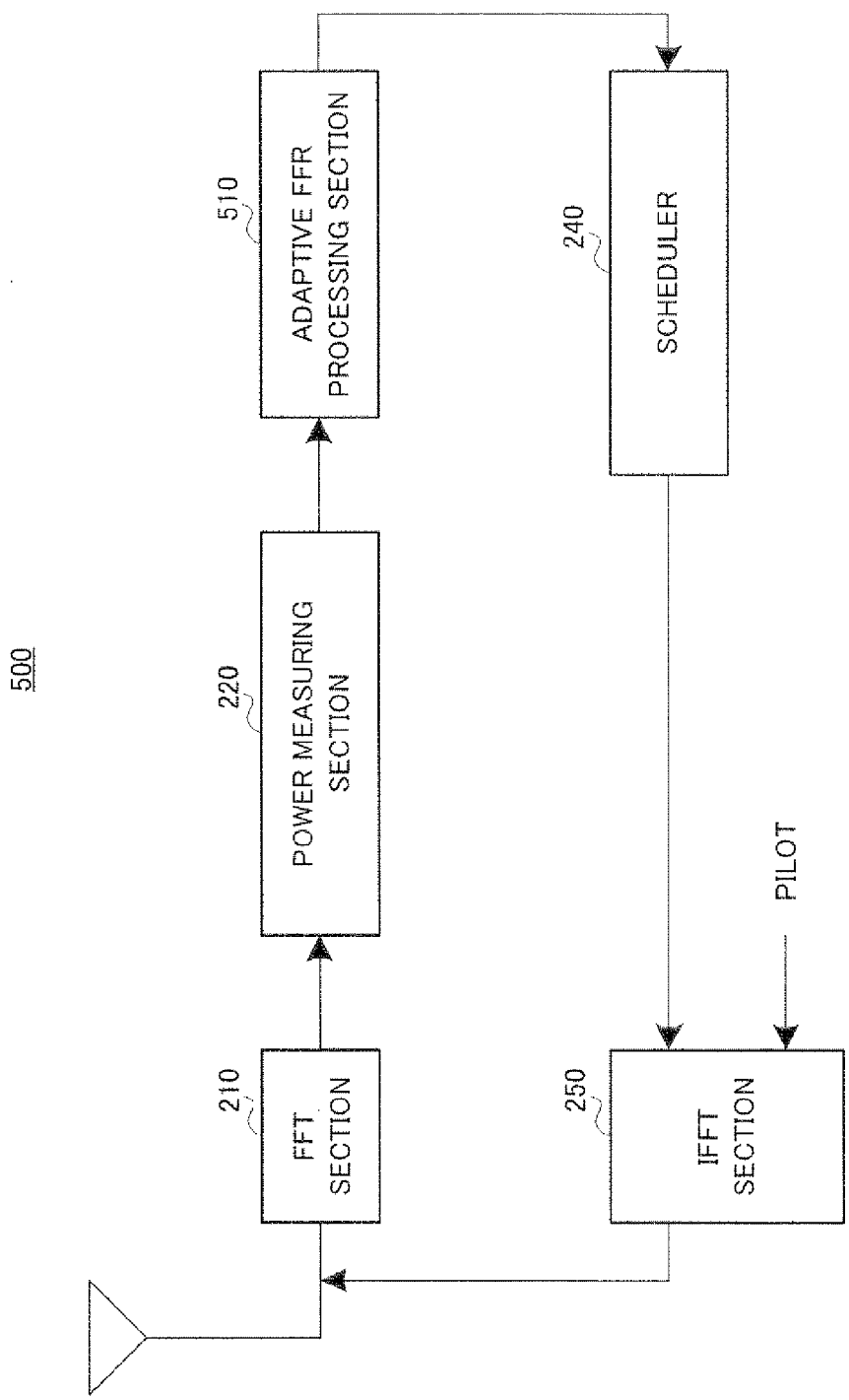
FIG. 14 is a block diagram showing the configuration of a base station according to Embodiment 3.

As shown in FIG. 14, base station 500 according to the present embodiment has adaptive FFR processing section 510.

Adaptive FFR processing section 510 changes the transmission mode to the transmission mode associated with the measured power value of the shared radio resource.

Adaptive FFR processing section 510 holds in advance the mode change decision thresholds that are the boundaries of adjacent transmission modes and that are used for mode change decision. Further, adaptive FFR processing section 510 specifies two mode change decision thresholds that sandwich the measured power value of the shared radio resource, and selects the transmission mode associated with the range defined by these two mode change decision thresholds. Further, adaptive FFR processing section 510 directly changes the transmission mode from the current transmission mode to this selected transmission mode.

Figure 15:
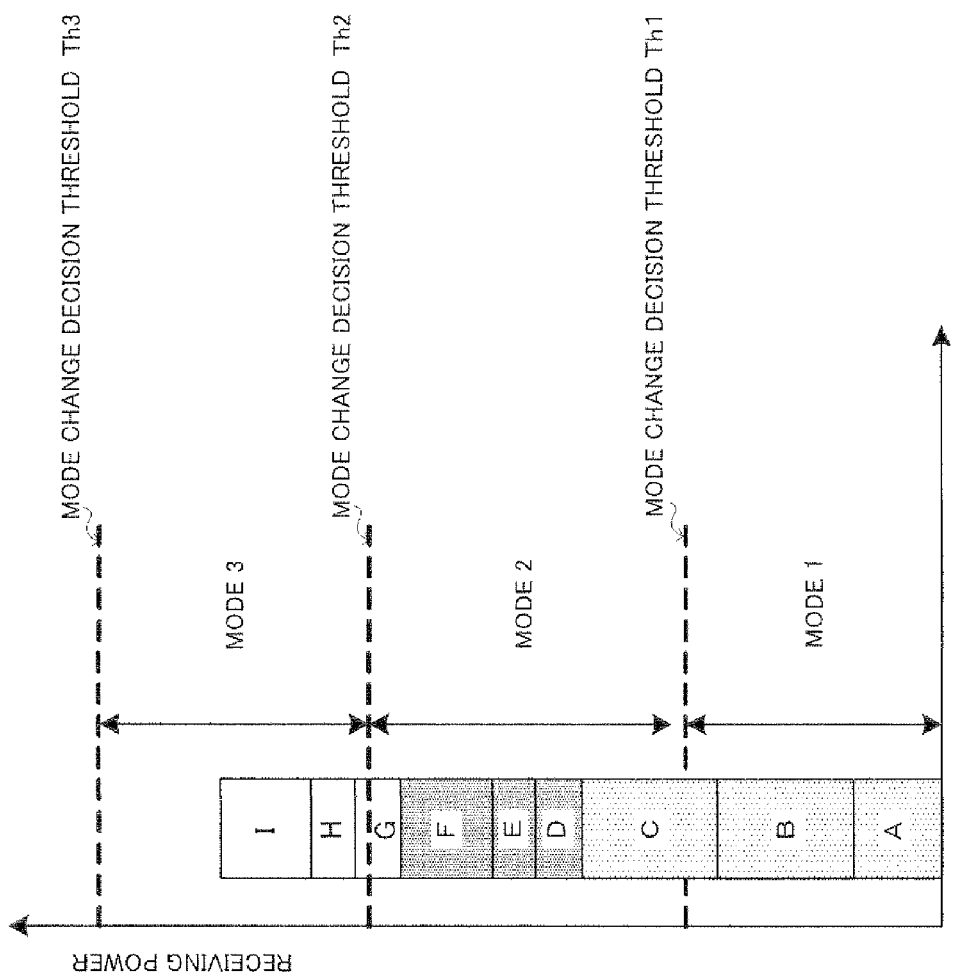
FIG. 15 illustrates adaptive FFR processing in the base station of FIG. 14.

For example, as shown in FIG. 15, adaptive FFR processing section 510 holds mode change decision thresholds Th1 to Th3. Further, if the measured power value shown in FIG. 15 is acquired, the transmission mode is changed to mode 3 defined by mode decision thresholds Th2 and Th3.

Thus, according to the present embodiment, in base station 500, adaptive FFR processing section 510 associates transmission modes and power value ranges in advance, and directly changes the transmission mode to the transmission mode associated with the power value range to which the combined receiving power value belongs.

By this means, unlike Embodiment 1 that changes the transmission mode in a stepwise manner, the transmission mode is directly changed to the transmission mode associated with the power value range to which the combined receiving power belongs, so that it is possible to change the transmission mode to an adequate transmission mode fast.

Embodiment 4

With the present embodiment, a time average section that averages the receiving power in the time domain is provided in the configuration of the base station of Embodiment 3.

Figure 16:
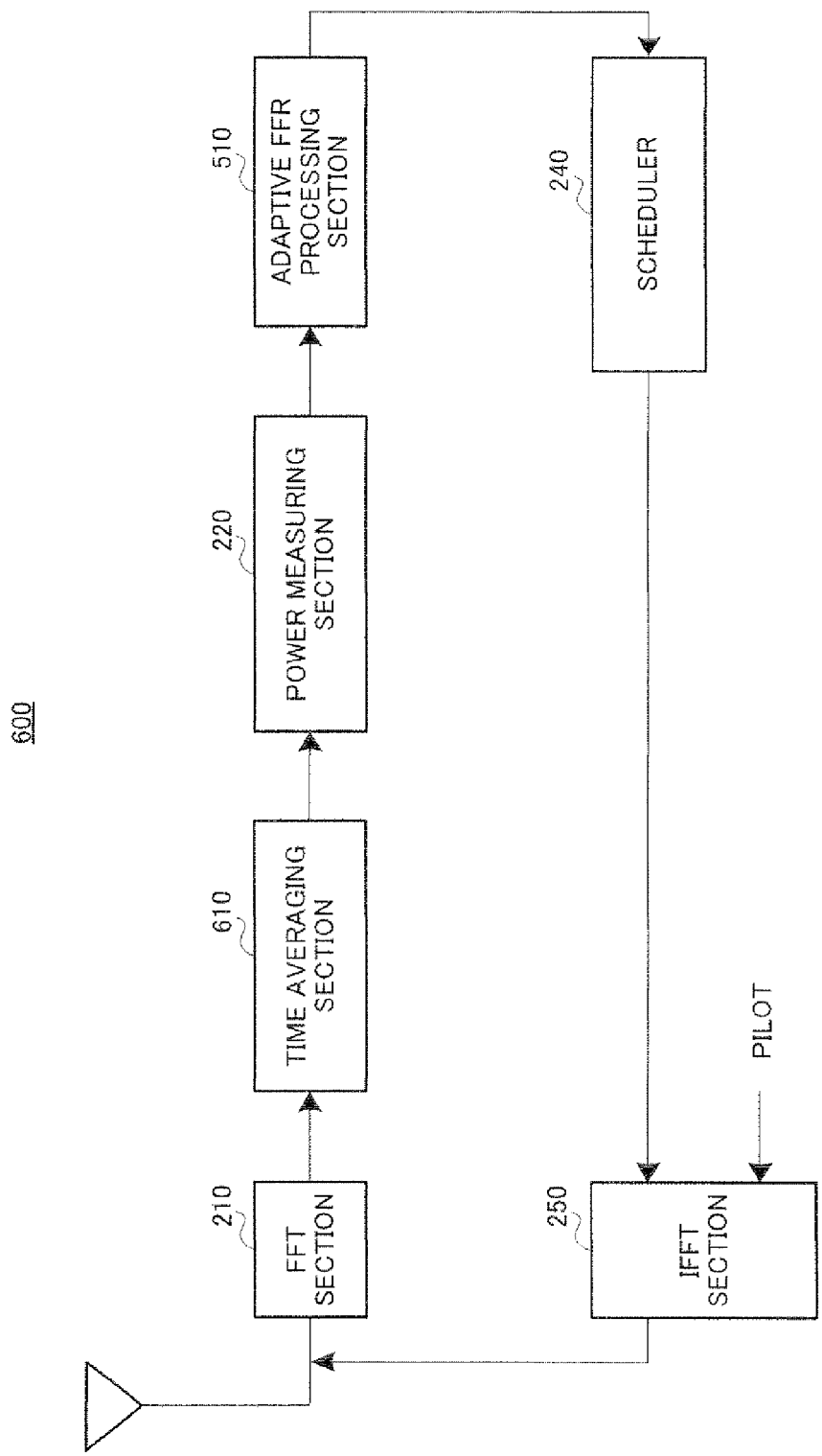
FIG. 16 is a block diagram showing the configuration of a base station according to Embodiment 4.

As shown in FIG. 16, base station 600 of the present embodiment provides time average section 610 between FFT section 210 and power measuring section 220.

Time average section 610 averages the power of an input signal for power measuring section 220 in the time domain.

Here, strictly speaking, the receiving power levels of reference reports transmitted from UE's vary. Further, interference report signals weaken or strengthen each other, and therefore the power of the shared radio resource is likely to fluctuate (Rayleigh distribution). Consequently, if the fluctuation is significant, there is a possibility that the transmission mode (reuse factor) is not selected adequately.

Therefore, with the present embodiment, by providing time average section 610, the power of an input signal to power measuring section 220 is averaged in the time domain to remove the influence of power fluctuation in a shared radio resource to reuse factor selection. By this means, the distribution of signal powers becomes low, so that it is possible to reduce power fluctuation in the shared radio resource and, as a result, select the reuse factor adequately.

Embodiment 5

In Embodiments 1 to 4, interference reports transmitted from wireless terminals that are present in the subject cell are also used as a criterion for deciding the mode change. That is, the transmission mode is determined taking into account the influence of interference given to UE's in the subject cell.

To change the transmission mode more adequately, it is preferable to determine the transmission mode based on only interference given from the subject cell to adjacent cells. Therefore, the present embodiment shows a transmission mode change method where interference reports from wireless terminals that are present in the subject cell are excluded from criteria for deciding a mode change. Especially, an example case will be explained where that method is applied to Embodiment 3.

Figure 17:
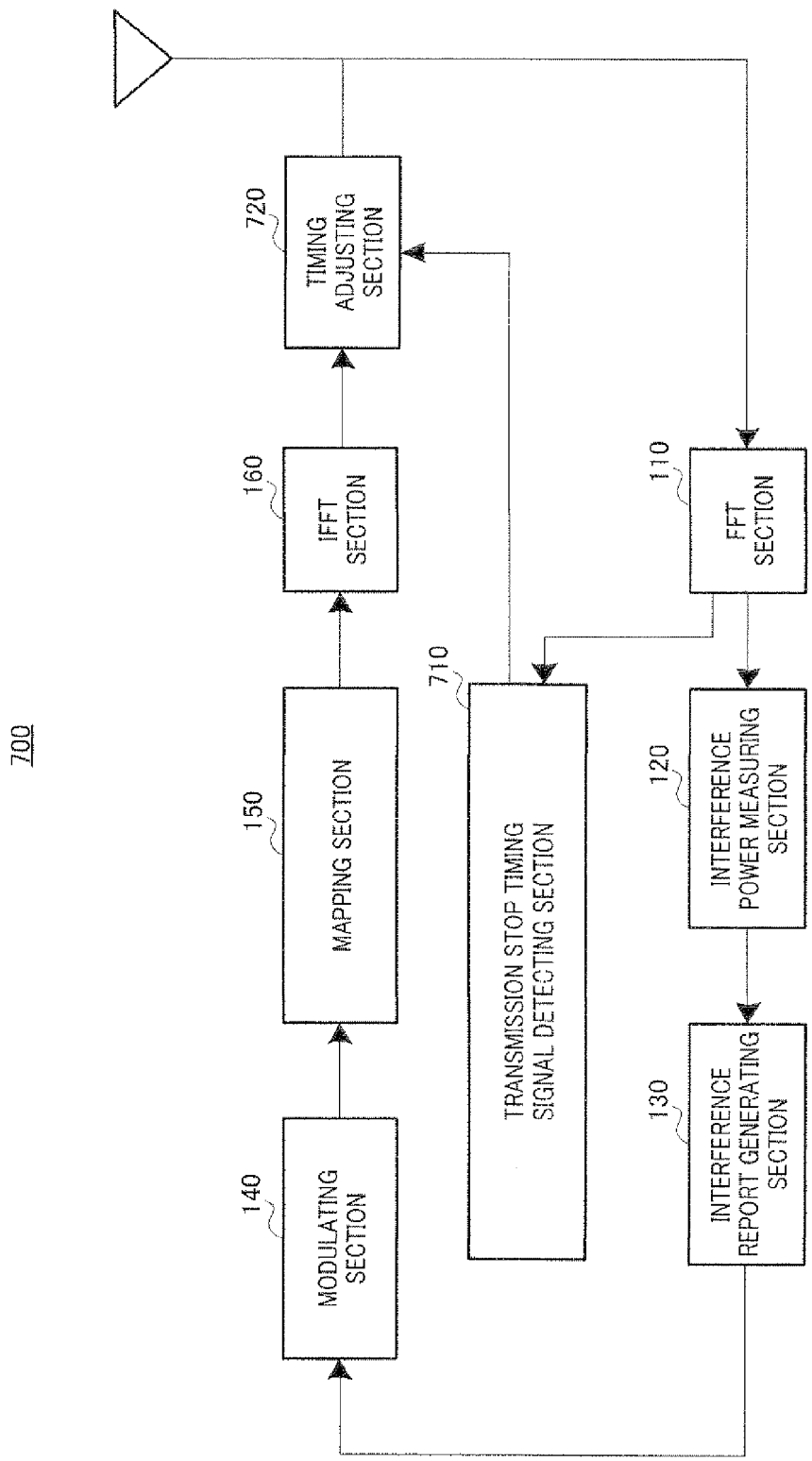
FIG. 17 is a block diagram showing the configuration of a wireless terminal according to Embodiment 5.

As shown in FIG. 17, wireless terminal 700 of the present embodiment has transmission stop timing signal detecting section 710 and timing adjusting section 720.

Transmission stop timing signal detecting section 710 detects a transmission stop timing signal included in a signal received via FFT section 110. Further, transmission stop timing signal detecting section 710 detects a transmission stop timing signal transmitted from the base station of the cell in which wireless terminal 700 locates.

Timing adjusting section 720 adjusts the transmission timing of an interference report based on the transmission stop timing signal detected in transmission stop timing signal detecting section 710.

Figure 18:
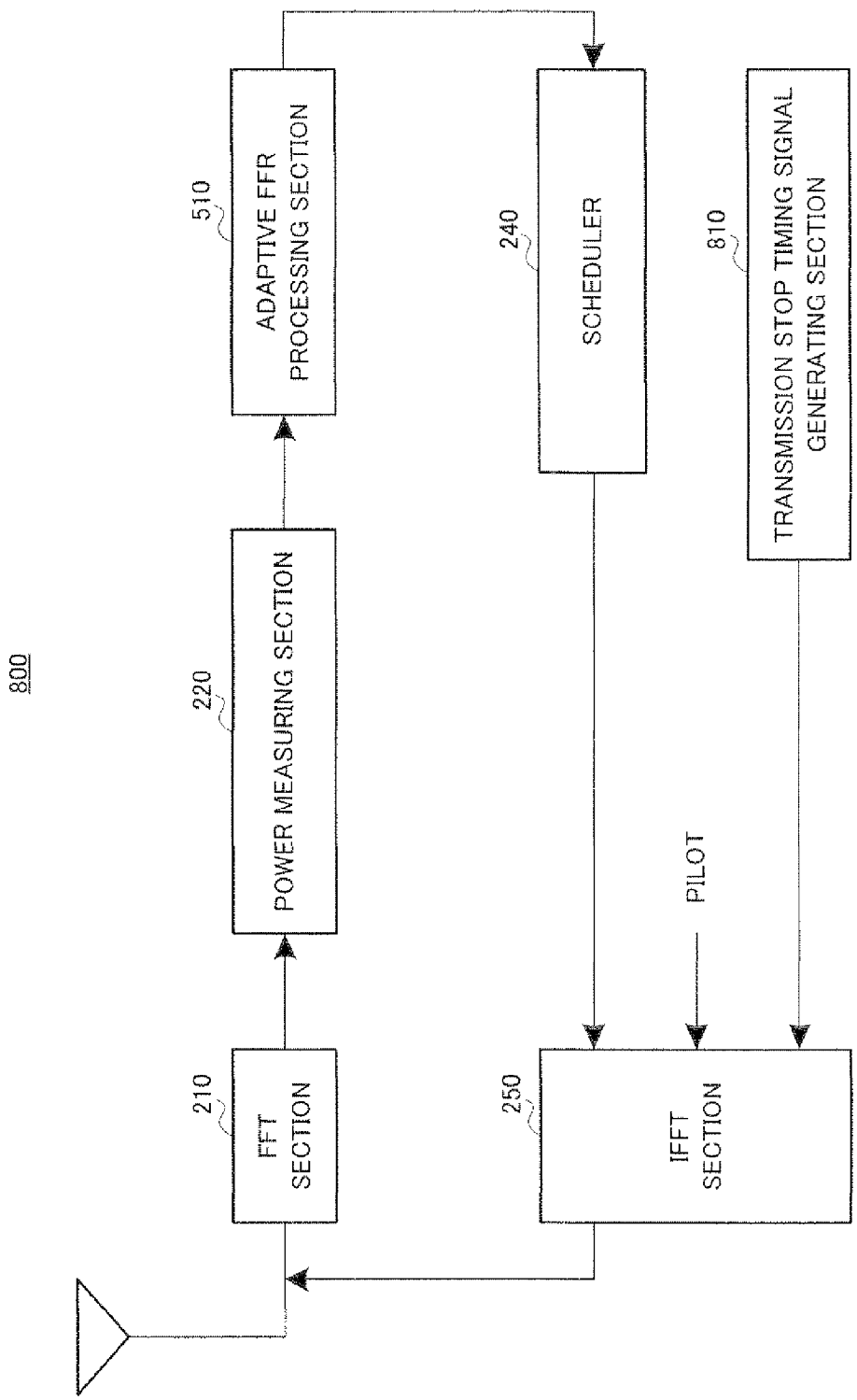
FIG. 18 is a block diagram showing the configuration of a base station according to Embodiment 5.

As shown in FIG. 18, base station 800 of the present embodiment has transmission stop timing signal generating section 810.

Transmission stop timing signal generating section 810 generates a transmission stop timing signal for controlling interference reports of wireless terminals 700 in the subject cell not to be transmitted during the transmission period of interference reports in adjacent cells. This transmission stop timing signal is transmitted to wireless terminals 700 that are present in the subject cell.

Next, a wireless communication system formed with wireless terminals 700 and base stations 800 having the above configurations, will be explained. Here, even in this case, a case will be explained where the wireless communication system is in the condition shown in FIG. 4.

Figure 19:
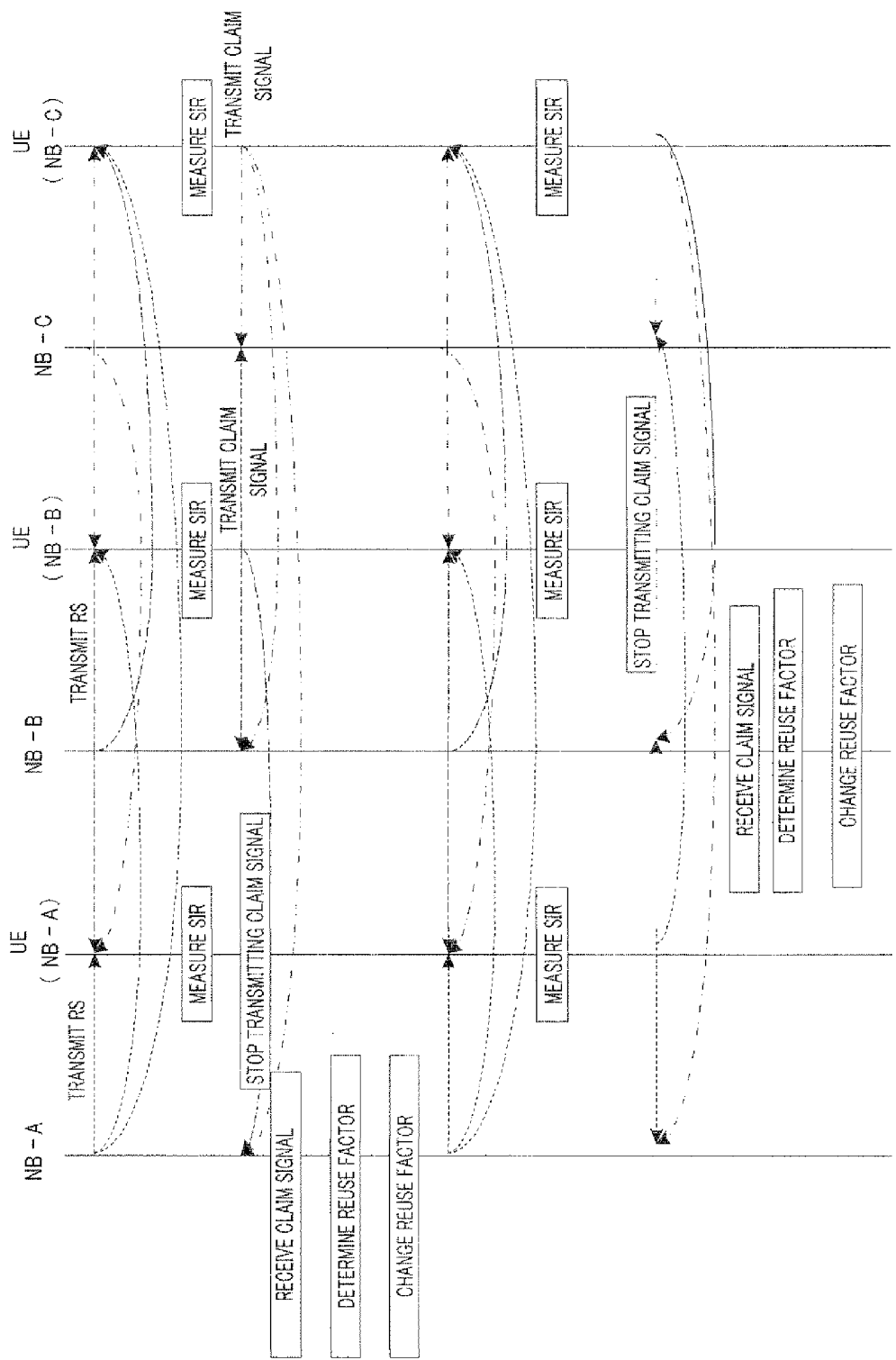
FIG. 19 illustrates the operations in a wireless communication system according to Embodiment 5.

As shown in FIG. 19, NB-A, NB-B and NB-C each transmit an RS and data to UE's. UE's that are present in cells A, B and C measure the SIR's.

First, NB-A performs processing for changing the transmission mode based on interference reports from UE's that are present in adjacent cells.

Figure 20B:
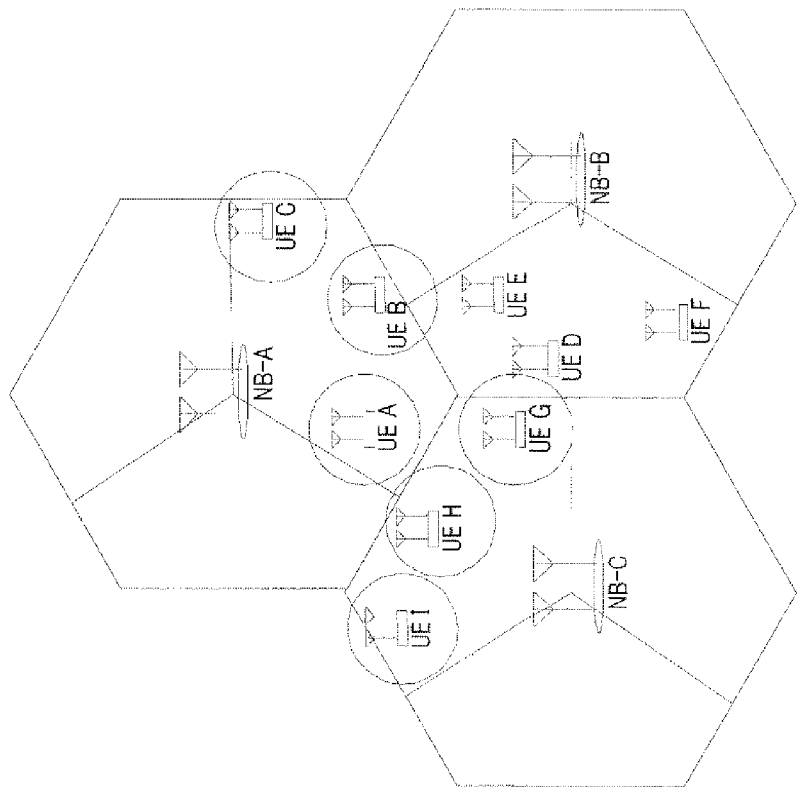
FIG. 20 illustrates the operations in a wireless communication system according to Embodiment 5.
Figure 20A:
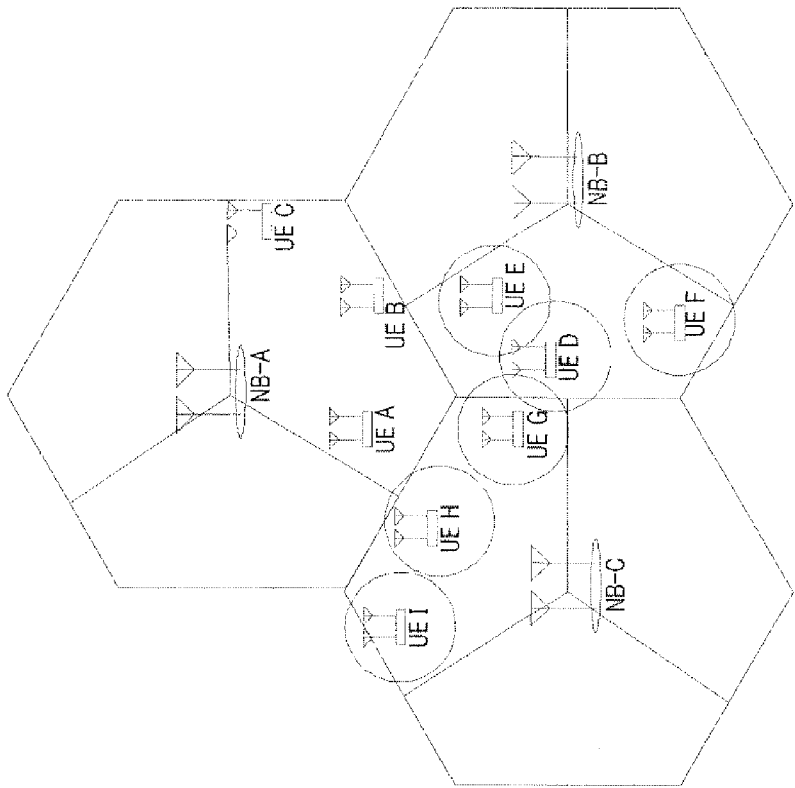

To be more specific, UE's that are present in cells B and C generate interference report signals based on the measured SIR's and transmit these interference report signals using the shared radio resource. In this case, by transmitting a transmission stop timing signal, NB-A stops transmission of interference reports in the UE's that are present in cell A. That is, as shown in FIG. 20A, UE-A to UE-C that are present in cell A stop transmitting interference report signals at the timings when UE-D to UE-I (circled in the figure) that are present in cells B and C transmit interference report signals. By this means, NB-A can receive only interference reports transmitted from adjacent cells (see the left part of FIG. 21).

Further, NB-A determines the reuse factor based on the interference reports transmitted from adjacent cells and changes the reuse factor to this determined reuse factor.

Further, after changing the reuse factor, NB-A changes downlink allocation and thereupon transmits an RS and data to UE's. At the same time, NB-B and NB-C also transmit an RS and data to UE's. Further, the UE's that are present in cells A, B and C each measure the SIR.

Next, NB-B performs processing for changing the transmission mode based on interference reports from the UE's that are present in adjacent cells.

This time, NB-B performs processing for changing the transmission mode, and therefore transmission of interference reports in the UE's that are present in cell B is stopped. That is, as shown in FIG. 20B, UE-D to UE-F stop transmitting interference report signals at the timings when UE-A to UE-C and UE-E to UE-I (circled in the figure) that are present in cells A and C transmit interference report signals. By this means, NB-B can receive only interference reports transmitted from adjacent cells (see the central part of FIG. 21).

Figure 21:
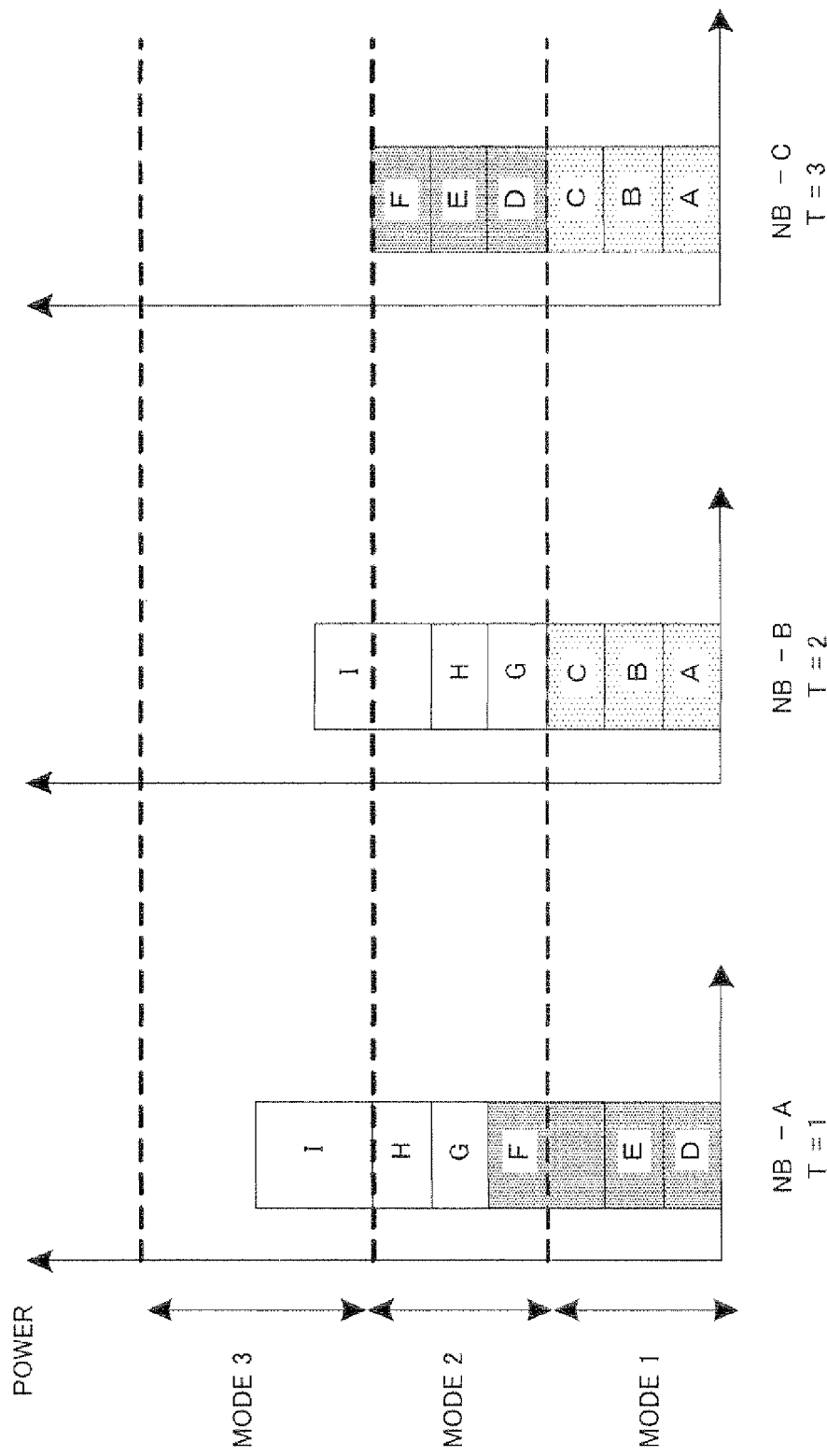
FIG. 21 illustrates the receiving condition of interference reports in base stations according to Embodiment 5.

Similarly, NB-C can also receive interference reports transmitted from adjacent cells (see the right part of FIG. 21). As described above, in the wireless communication system of the present embodiment, a plurality of contiguous base stations each stop transmission of interference reports in the subject cell in order, so that each base station can acquire only interference reports of adjacent cells in the stop period of the subject cell.

Thus, according to the present embodiment, in base station 800, transmission stop timing signal generating section 810 transmits a transmission stop timing signal for stopping transmission of interference reports in wireless terminals in the subject cell during the transmission period where a plurality of wireless terminals in adjacent cells stop transmitting interference reports.

By this means, base station 800 can select the transmission mode based on only interference reports from adjacent cells excluding interference reports from the subject cell, so that it is possible to change the transmission more adequately.

Embodiment 6

In Embodiment 5, by sequentially stopping transmission of interference reports in UE's between adjacent cells, the transmission mode is changed based on only interference reports transmitted from adjacent cells. With the present embodiment, based on a downlink signal transmitted from a base station of the cell in which transmission of interference reports in wireless terminals is stopped, the wireless terminals measure the downlink path loss to that base station. Further, wireless terminals that are present in adjacent cells to the base station, control transmission power based on the path loss and then transmit interference reports.

Figure 22:
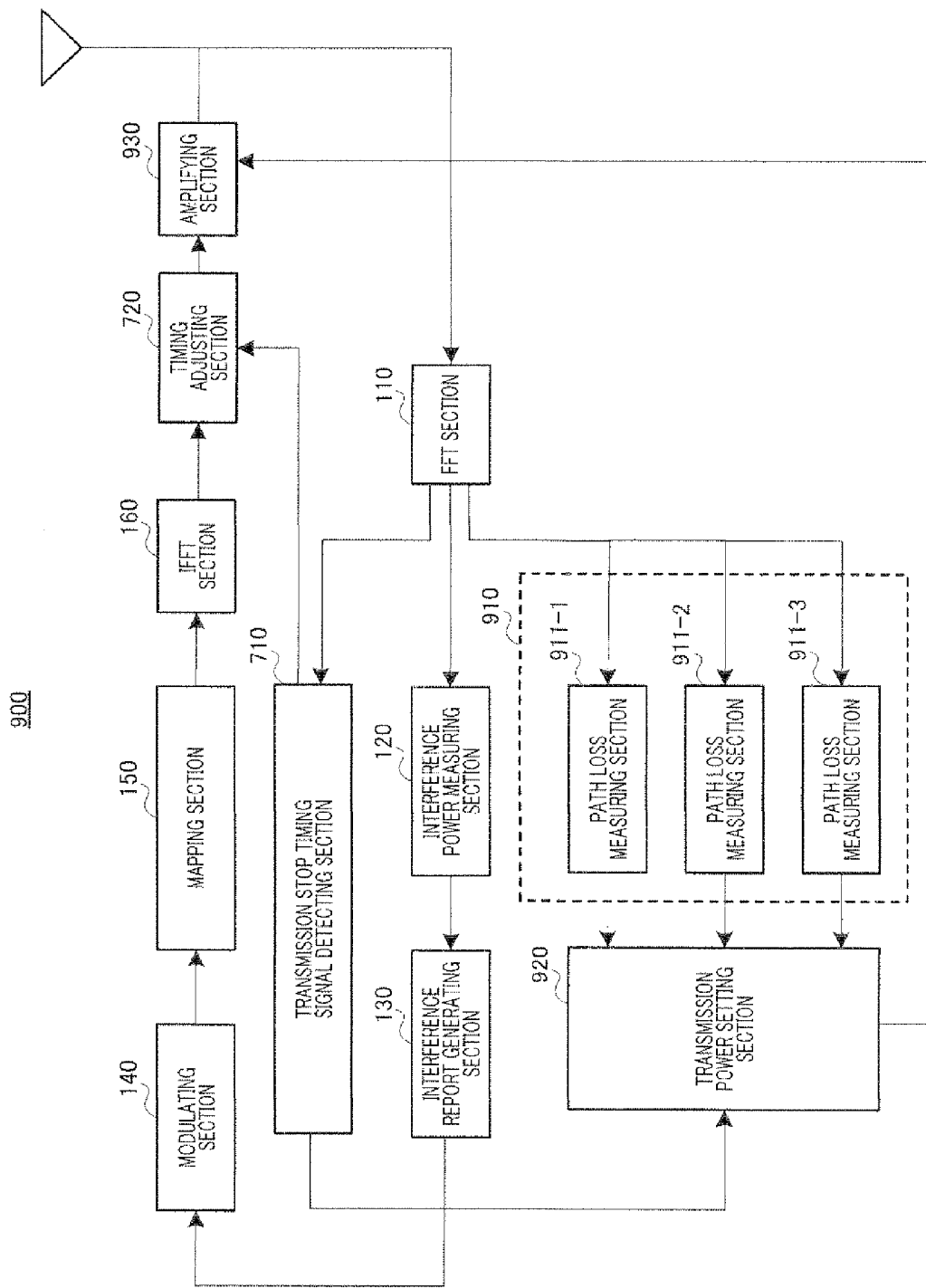
FIG. 22 is a block diagram showing the configuration of a wireless terminal according to Embodiment 6.

As shown in FIG. 22, wireless terminal 900 of the present embodiment has path loss measuring section 910, transmission power setting section 920 and amplifying section 930.

Path loss measuring section 910 has m path loss measuring sections 911 associated with adjacent cells to the subject cell. The figure shows the case of m=2. That is, path loss measuring section 910 has three path loss measuring sections 911-1 to 911-3 including path loss measuring section 911 associated with the subject cell. Path loss measuring sections 911-1 to 911-3 each measure the downlink path loss between the base station and the subject wireless terminal in the corresponding cell, using a downlink signal transmitted from that cell during the period where transmission of interference reports is stopped in that cell.

Transmission power setting section 920 controls transmission power based on the measured path loss values to match adjacent cells to a cell in which the subject wireless terminal is present. Transmission power setting section 920 sets the amplification factor of amplifying section 930 based on the measured path loss values to match the adjacent cells to the cell in which the subject terminal is present.

Amplifying section 930 amplifies interference reports at the amplification factor set in transmission power setting section 920.

Here, as described above, the receiving power levels of reference reports transmitted from UE's vary. Further, interference report signals weaken or strengthen each other, and therefore the power of the shared radio resource is likely to fluctuate (Rayleigh distribution). Consequently, if the fluctuation is significant, the transmission mode (reuse factor) may not be selected adequately.

Therefore, with the present embodiment, wireless terminal 900 controls transmission power based on measured path loss values to match adjacent cells to a cell in which the subject wireless terminal is present. By this means, the average receiving power of interference report signals in a base station is fixed, so that it is possible to reduce the fluctuation of the combined receiving power of interference report signals in the shared radio resource. This is based on the fact that, when the average receiving power is fixed in transmission diversity of equal gain combination and the number of transmission antennas increases, distribution is reduced. In view of the above, in a base station, it is possible to select the reuse factor adequately.

Embodiment 7

As in Embodiment 5, the present embodiment shows a transmission mode change method where interference reports from wireless terminals that are present in the subject cell are excluded from criteria for deciding a mode change. To be more specific, interference reports are transmitted by different carriers between cells. By this means, it is possible to change the transmission mode based on only interference reports transmitted from adjacent cells.

Figure 23:
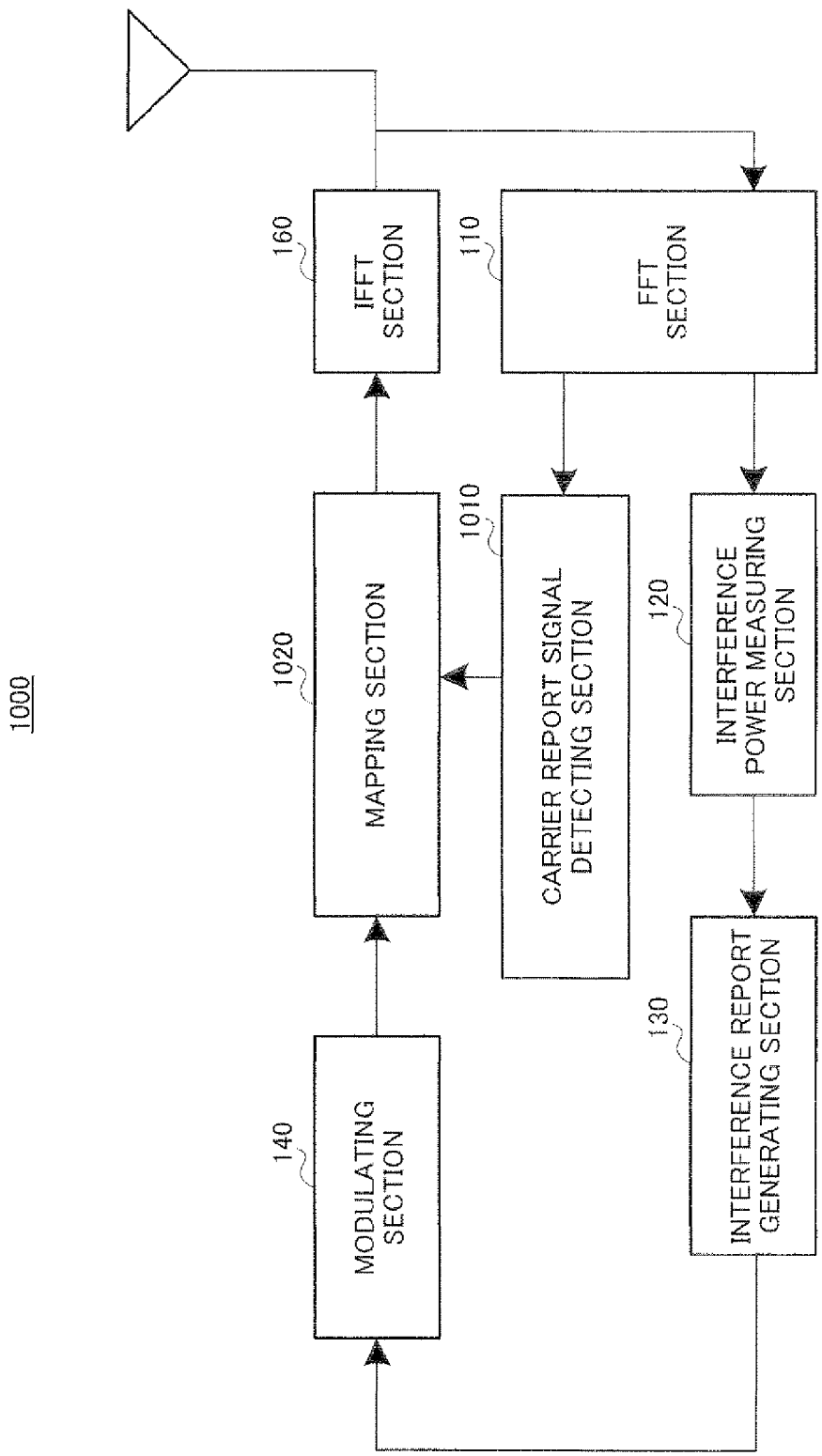
FIG. 23 is a block diagram showing the configuration of a wireless terminal according to Embodiment 7.

As shown in FIG. 23, wireless terminal 1000 of the present embodiment has carrier report signal detecting section 1010 and mapping section 1020.

Carrier report signal detecting section 1010 detects a carrier report signal included in a signal received via FFT section 110. This detected carrier report signal refers to a signal transmitted from the base station of the cell in which the subject wireless terminal is present, and indicates a carrier used for transmitting interference reports in wireless terminals 1000 that are present in that cell, among a plurality of carriers forming a shared radio resource.

Mapping section 1020 maps an interference report signal on the carrier indicated by the carrier report signal detected in carrier communication signal detecting section 1010.

Figure 24:
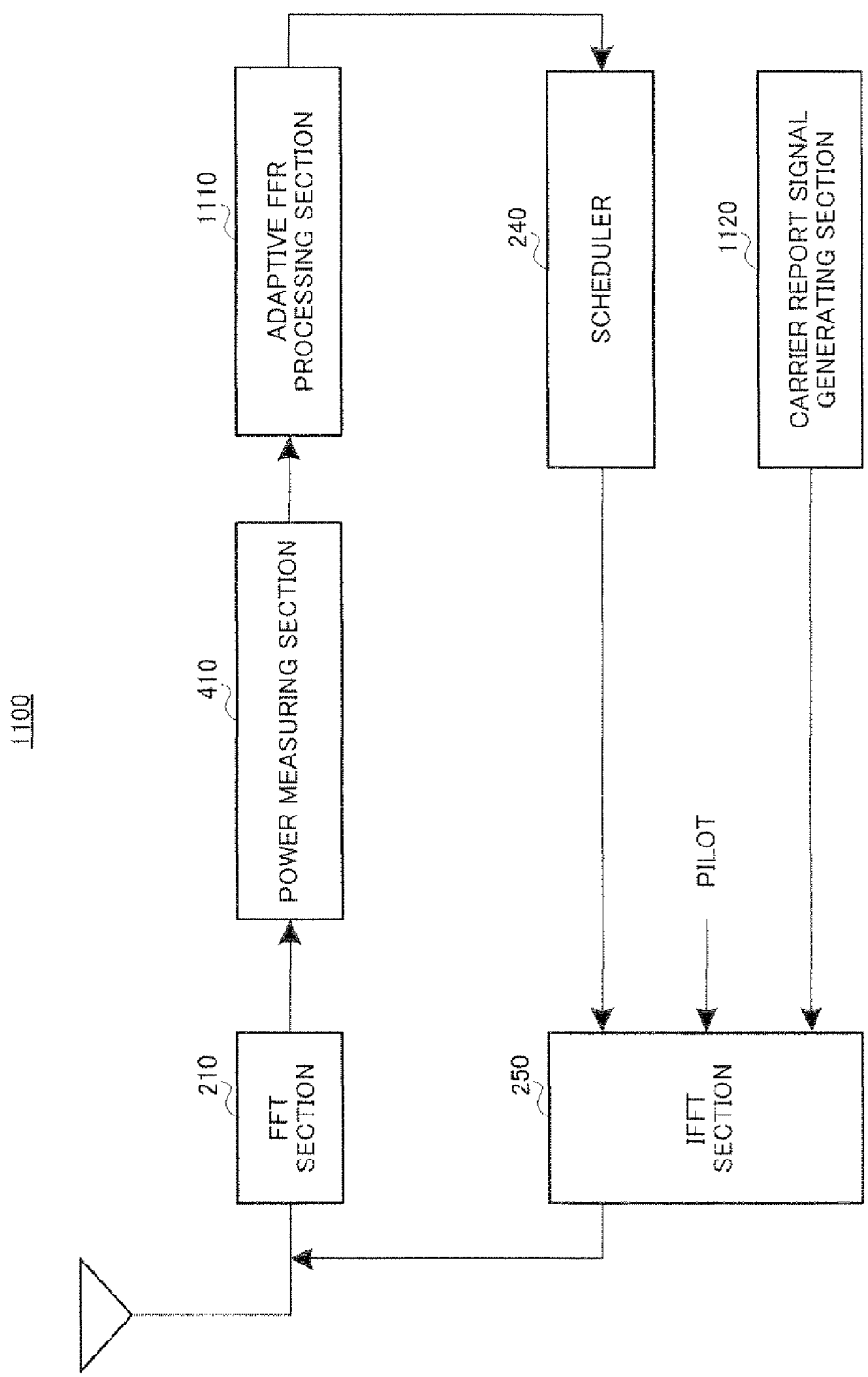
FIG. 24 is a block diagram showing the configuration of a base station according to Embodiment 7.

As shown in FIG. 24, base station 1100 of the present embodiment has adaptive FFR processing section 1110 and carrier report signal generating section 1120.

Adaptive FFR processing section 1110 adds all measured power values in carriers associated with adjacent cells, among the plurality of carriers forming the shared radio resource. Further, adaptive FFR processing section 1110 changes the transmission mode based on the addition result.

Carrier report signal generating section 1120 generates a carrier report signal indicating a carrier that should be used by wireless terminals 1000 that are present in the cell covered by base station 1100, among the plurality of carriers forming the shared radio resource.

Figure 25:
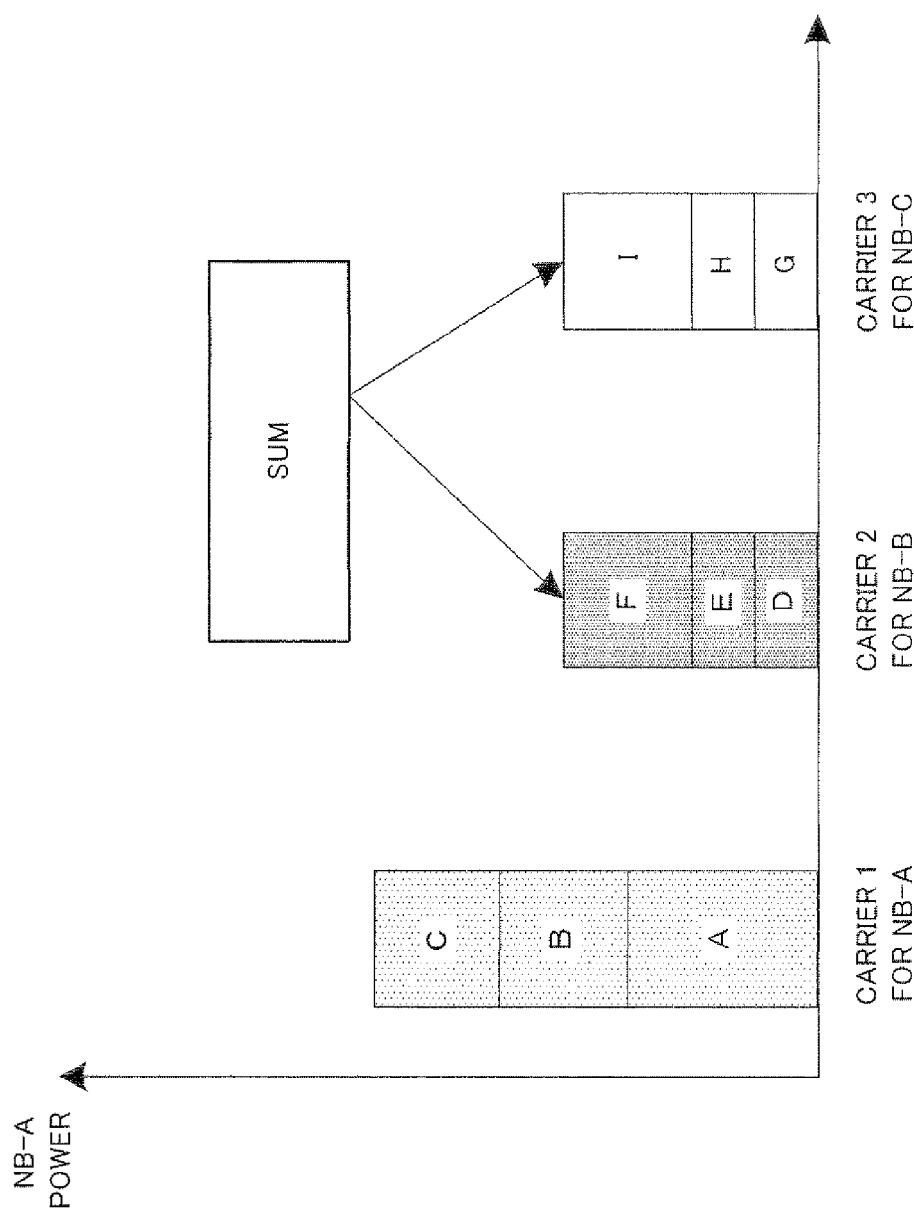
FIG. 25 illustrates the receiving condition of interference reports in base stations according to Embodiment 7.

FIG. 25 shows examples of power distributions observed in NB-A in the case where the wireless communication system is in the condition shown in FIG. 4. For transmitting interference reports, carrier 1 is used in cell A, and carriers 2 and 3 are used in cells B and C, respectively. Therefore, NB-A changes the transmission mode based on the added power value adding the combined receiving powers observed in carriers 2 and 3.

By this means, the transmission mode is determined based on only interference given from the subject cell to adjacent cells, so that it is possible to change the transmission mode more adequately.

Thus, according to the present embodiment, in base station 1100, adaptive FFR processing section 1110 changes the transmission mode based on the combined receiving powers combining receiving powers of interference reports in carriers to match adjacent cells. Also, the carriers used for transmitting interference reports vary between adjacent cells.

By this means, base station 1100 can change the transmission mode based on only interference reports from adjacent cells excluding interference reports from the subject cell, so that it is possible to change the transmission mode more adequately.

Embodiment 8

As in Embodiment 5, the present embodiment shows a transmission mode change method where interference reports from wireless terminals that are present in the subject cell are excluded from criteria for deciding a mode change. To be more specific, a wireless terminal controls an antenna directivity such that the direction of low transmission power (i.e. the null direction) is directed toward the base station of the cell in which the wireless terminal is present, and the wireless terminal transmits an interference report. By this means, it is possible to change the transmission mode based on only interference reports transmitted from adjacent cells.

Figure 26:
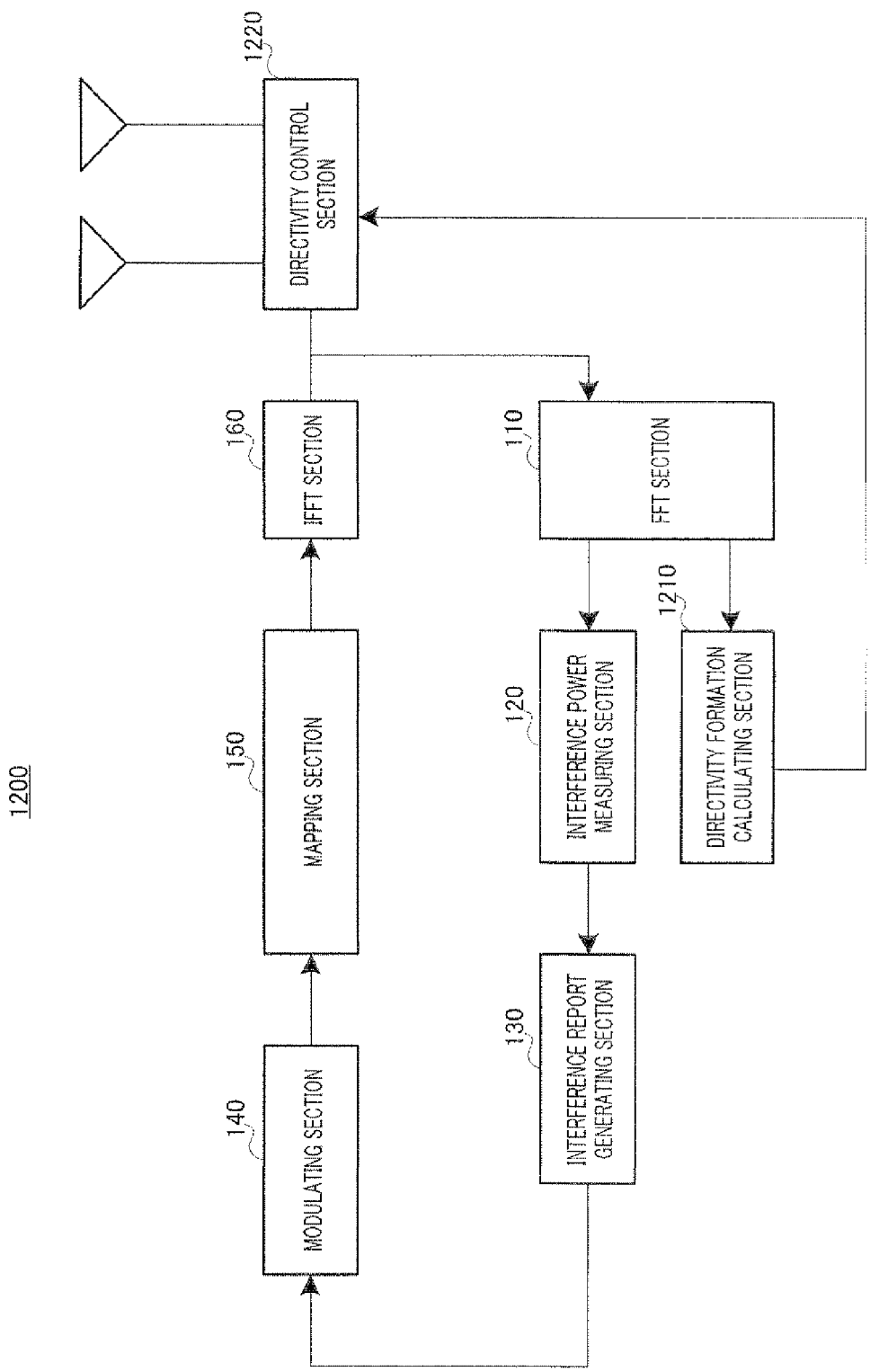
FIG. 26 is a block diagram showing the configuration of a wireless terminal according to Embodiment 8.

As shown in FIG. 26, wireless terminal 1200 of the present embodiment has directivity formation calculating section 1210 and directivity control section 1220.

Directivity formation calculating section 1210 calculates a directional weight coefficient so that the null direction is directed toward the base station of the cell in which the wireless terminal is present. Here, for example, directivity formation calculating section 1210 specifies the received directional weight coefficient in the case of the best received quality of a signal transmitted from the base station of the cell in which the wireless terminal is present. This specified, received directional weight coefficient is the weight coefficient in the case where directivity is formed against the base station of the cell in which the subject wireless terminal is present, and where the null direction is directed opposite to the base station. Based on this specified, received directional weight coefficient, directivity formation calculating section 1210 calculates a directional weight coefficient so that the null direction is directed toward the base station of the cell in which the wireless terminal is present.

Directivity control section 1220 controls the antenna directivity using the directional weight coefficient calculated in directivity formation calculating section 1210, and transmits an interference report signal that is received via IFFT section 160.

Figure 27:
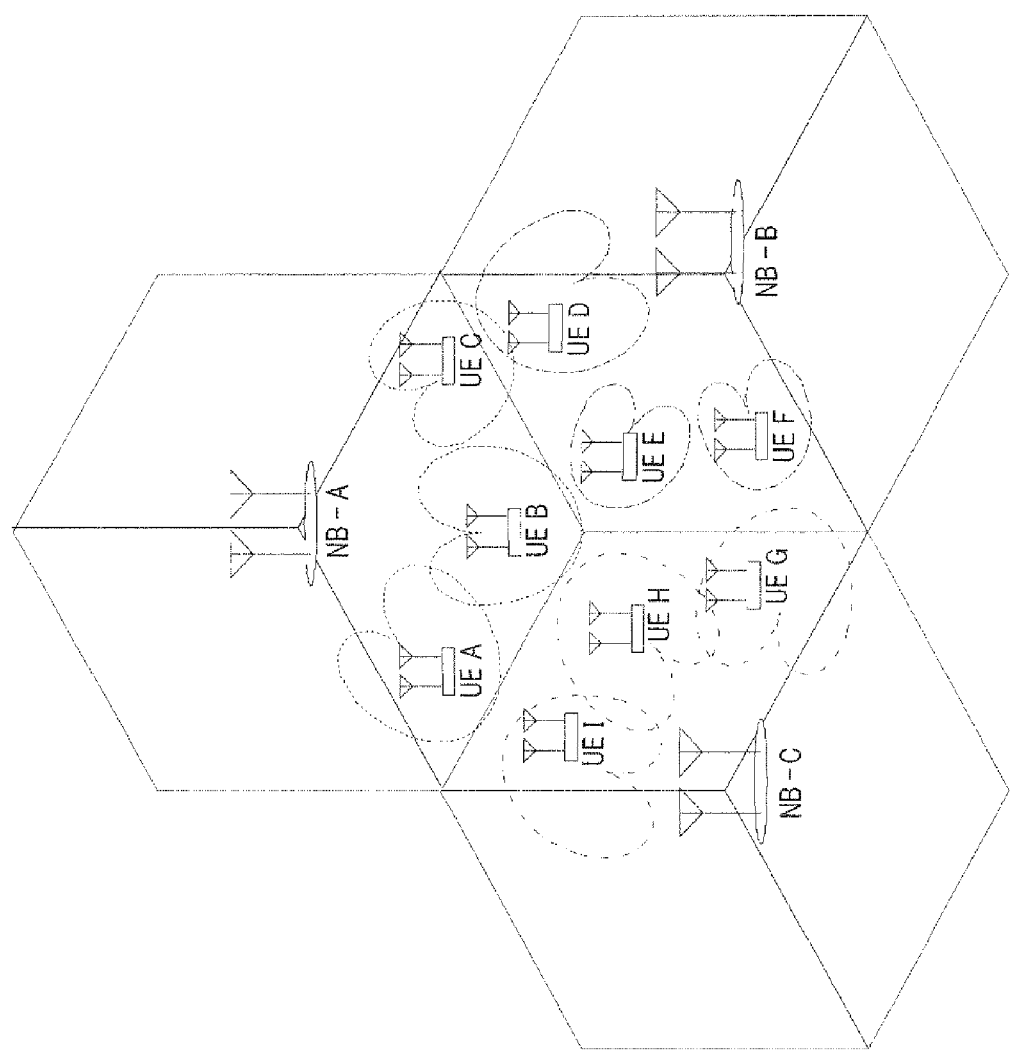
FIG. 27 illustrates an antenna directivity formed by the wireless terminal of FIG. 26.
Figure 28:
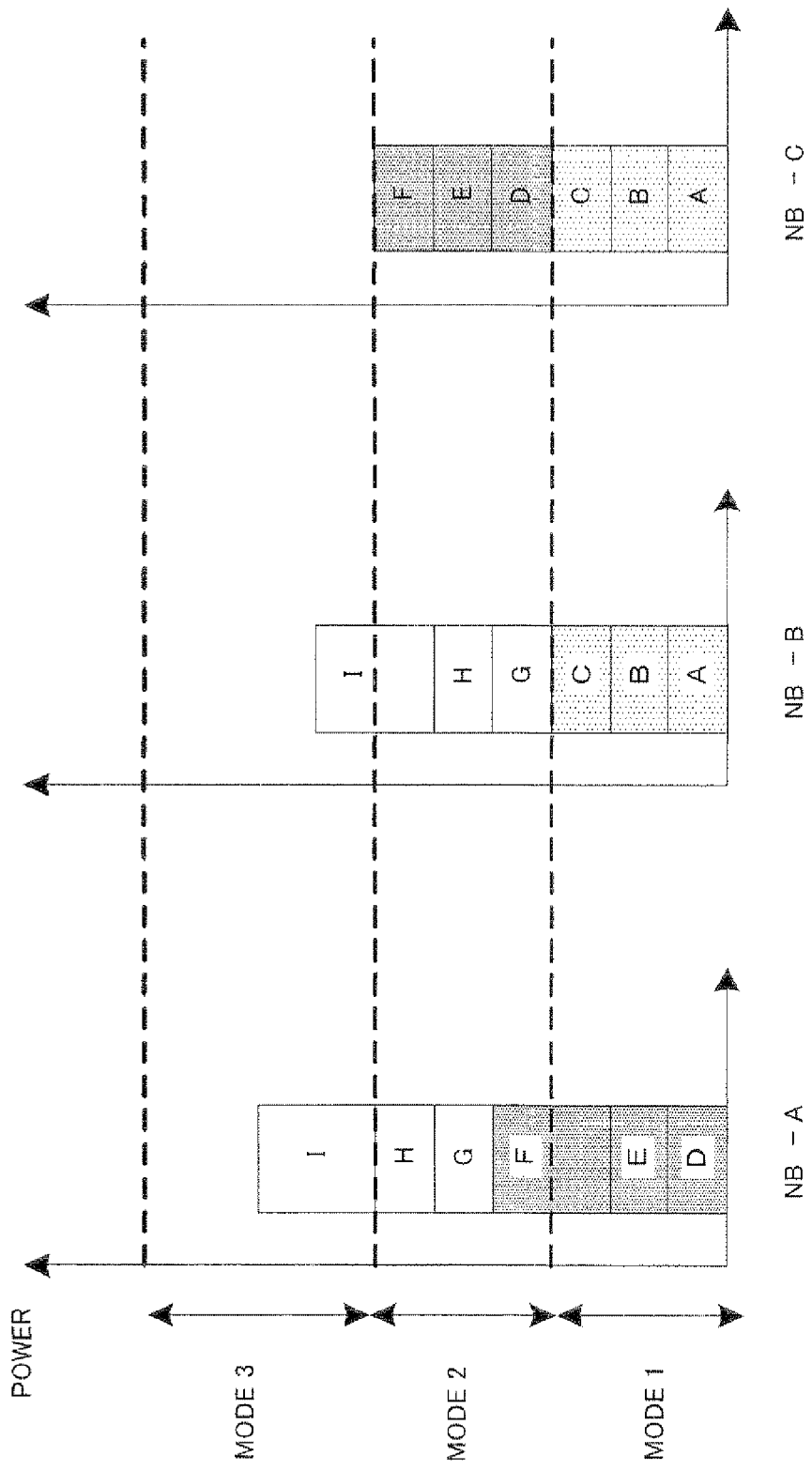
FIG. 28 illustrates the receiving condition of interference reports in base stations according to Embodiment 8.

Each wireless terminal 1200 in each cell in the wireless communication system controls the antenna directivity so that the null direction is directed toward the base station of the cell in which the subject wireless terminal is present, and therefore the wireless communication system is in the condition shown in FIG. 27.

In each of the base stations in the wireless communication system, the combined receiving powers excluding interference reports transmitted from wireless terminals 1200 in the subject cell are observed. With the present embodiment, it is possible to use base stations having the same configuration as base station 500 explained in Embodiment 3.

As described above, according to the present embodiment, in wireless terminal 1200, directivity formation calculating section 1210 calculates a directional weight coefficient so that the null direction is directed toward the base station of the cell in which the subject wireless terminal is present, and directivity control section 1220 controls the antenna directivity using the directional weight coefficient calculated in directivity formation calculating section 1210 and transmits an interference report signal.

By this means, a base station can select the transmission mode based on only interference reports from adjacent cells excluding interference reports from the subject cell, so that it is possible to change the transmission mode more adequately.

Embodiment 9

As in Embodiment 5, the present embodiment shows a transmission mode change method where interference reports from wireless terminals that are present in the subject cell are excluded from criteria for deciding a mode change. To be more specific, interference reports spread using varying spreading codes between cells, are transmitted. By this means, it is possible to change the transmission mode based on only interference reports transmitted from adjacent cells.

Figure 29:
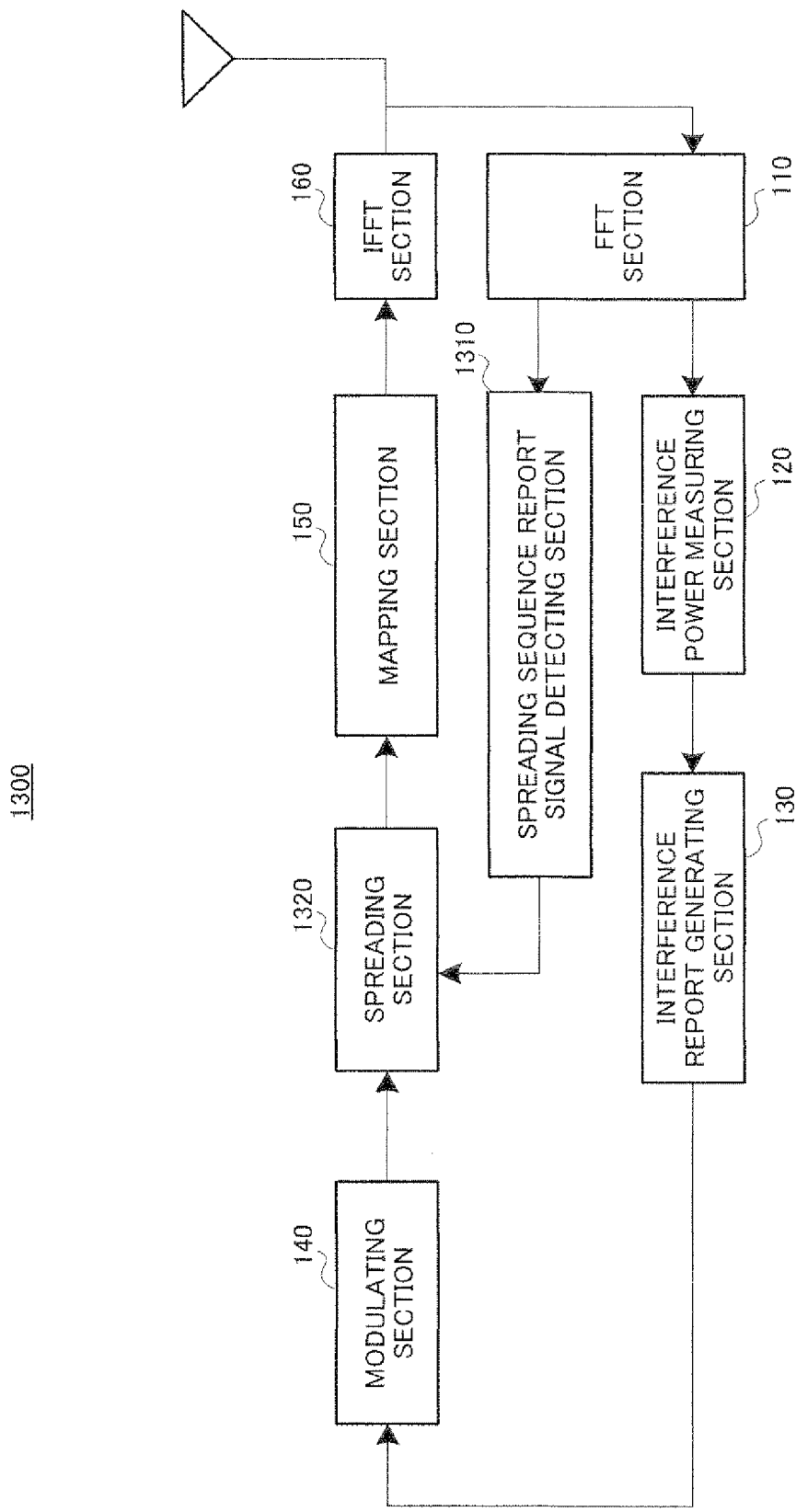
FIG. 29 is a block diagram showing the configuration of a wireless terminal according to Embodiment 9.

As shown in FIG. 29, wireless terminal 1300 of the present embodiment has spread sequence report signal detecting section 1310 and spreading section 1320.

Spreading sequence report signal detecting section 1310 detects a spreading sequence report signal included in a signal received via FFT section 110. This detected spreading sequence report signal is the signal transmitted from the base station of the cell in which the subject wireless terminal is present, and represents the spreading sequence used by wireless terminals 1000 that are present in that cell.

Spreading section 1320 spreads an interference signal using the spreading sequence detected in spreading sequence report signal detecting section 1310.

Figure 30:
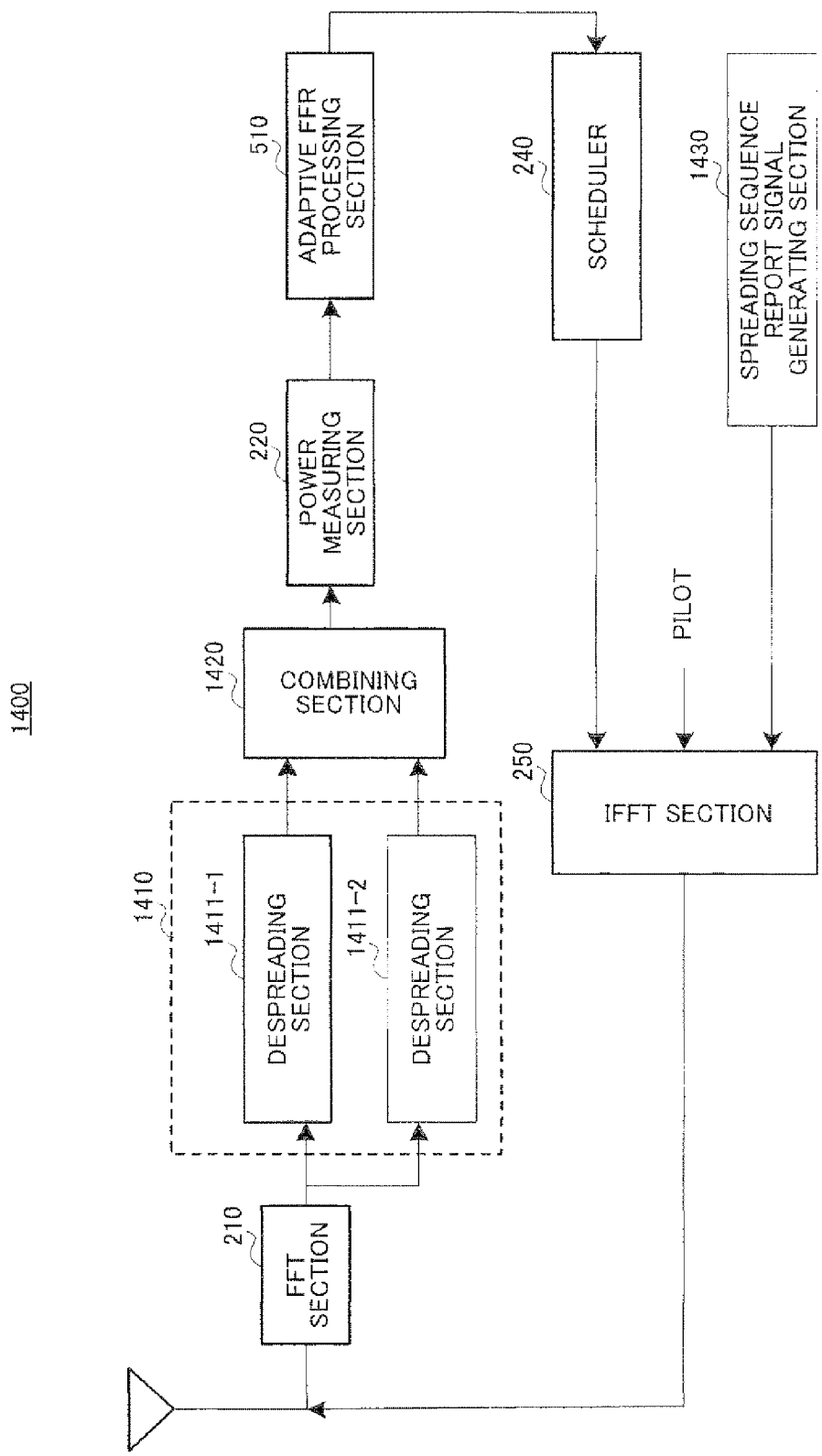
FIG. 30 is a block diagram showing the configuration of a base station according to Embodiment 9.

As shown in FIG. 30, base station 1400 of the present embodiment has despreading section 1410, combining section 1420 and spreading sequence report signal generating section 1430.

Despreading section 1410 has m despreading sections 1411 associated with adjacent cells, respectively. Here, different spreading sequences are allocated to m adjacent cells. Despreading sections 1411 despread signals received via FFT section 210, using spreading sequences allocated to the associated adjacent cells.

Combining section 1420 combines in power the signals subjected to despreading in despreading sections 1411, and outputs the combined signal to power measuring section 220. Power measuring section 220 measures the power of this combined signal.

Spreading sequence report signal generating section 1430 generates a spreading sequence report signal representing a spreading sequence allocated to the subject cell. This spreading sequence report signal is transmitted via IFFT section 250.

Also, in each embodiment, as a shared radio resource, it is possible to use a carrier comprised of direct-current components (i.e. DC carrier) among the subcarriers used in OFDM communication. Thus, it is possible to efficiently use a DC carrier that is not used in normal data transmission.

The disclosure of Japanese Patent Application No. 2007-49896, filed on Sep. 26, 2007, including the specification, drawings and abstract, is incorporated herein by reference in its entirety.

INDUSTRIAL APPLICABILITY

The wireless communication system, wireless base station apparatus and transmission control method are effective for shortening the time it takes to improve inter-cell interference and improving the system throughput.

The invention claimed is:

1. A wireless base station apparatus comprising:
an interference report receiver configured to receive interference reports transmitted from a plurality of wireless terminals that are present in a plurality of adjacent cells that are adjacent to a target cell, the interference reports being transmitted using selected carriers out of a plurality of carriers by each of the plurality of wireless terminals, based on a downlink reception quality from the wireless base station to each of the plurality of wireless terminals, the plurality of carriers being shared between the plurality of adjacent cells; and
an adaptive fractional frequency reuse controller configured to select one of a first transmission mode, a second transmission mode, and a third transmission mode, and control a transmission power in accordance with the selected one of the first transmission mode the second transmission mode, and the third transmission mode, wherein:
when power measurement values of the selected carriers are greater than an interference evaluation threshold, selecting as the first transmission mode, a carrier having a lowest downlink reception quality among the selected carriers, or as the second transmission mode, a carrier having a highest power measurement value among the selected carriers, and
when the power measurement values of the selected carriers corresponding to the first and second transmission modes are all lower than the interference evaluation threshold, selecting as the third transmission mode, a carrier having a highest downlink reception quality, and
the power measurement value of each of the selected carriers is calculated by combining the received interference reports using each of the selected carriers.

2. The wireless base station apparatus according to claim 1, further comprising a stop signal transmitter configured to transmit an interference report stop signal for stopping a wireless terminal that is present in the target cell from transmitting an interference report during a shared transmission period in which the plurality of wireless terminals that are present in the plurality of adjacent cells transmit the interference reports.

3. The wireless base station apparatus according to claim 1, further comprising:
a despreading section configured to receive interference reports spread using different spreading codes between the plurality of adjacent cells, and despread the received interference reports using the different spreading codes to generate despread signals of the plurality of adjacent cells; and
a power combiner configured to combine powers of the despread signals of the plurality of adjacent cells;
wherein the adaptive fractional frequency reuse controller selects the first transmission mode or the second transmission mode based on a value of the combined power.

4. The wireless base station apparatus according to claim 1, wherein the plurality of carriers includes a direct current carrier.

5. A transmission control method performed by a base station apparatus, comprising:
(a) receiving interference reports transmitted from a plurality of wireless terminals that are present in a plurality of adjacent cells that are adjacent to a target cell, the interference reports being transmitted using selected carriers out of a plurality of carriers by each of the plurality of wireless terminals, based on a downlink reception quality from the wireless base station to each of the plurality of wireless terminals, the plurality of carriers being shared between the plurality of adjacent cells;
(b) selecting one of a first transmission mode, a second transmission mode, and a third transmission mode, the selecting comprising:
when power measurement values of the selected carriers are greater than an interference evaluation threshold, selecting as the first transmission mode, a carrier having a lowest downlink reception quality among the selected carriers, or as the second transmission mode, a cattier having a highest power measurement value among the selected carriers, and
when the power measurement values of the selected carriers corresponding to the first and second transmission modes are all lower than the interference evaluation threshold, selecting as the third transmission mode, a carrier having a highest downlink reception quality,
wherein the power measurement value of each of the selected carriers is calculated by combining the received interference reports using each of the selected carriers; and
(c) controlling transmission power in accordance with the selected first transmission mode, the selected second transmission mode, or the selected third transmission mode.

* * * * *